US010112299B2

(12) United States Patent
Hiro et al.

(10) Patent No.: US 10,112,299 B2
(45) Date of Patent: Oct. 30, 2018

(54) MACHINING APPARATUS AND METHOD OF PRODUCING WORKPIECE

(71) Applicant: KABUSHIKI KAISHA YASKAWA DENKI, Kitakyushu-shi (JP)

(72) Inventors: Tatsuo Hiro, Fukuoka (JP); Kuniaki Katamine, Fukuoka (JP); Ryuta Kagawa, Fukuoka (JP); Yusuke Kinoshita, Fukuoka (JP); Manabu Okahisa, Fukuoka (JP); Masami Nakakura, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 168 days.

(21) Appl. No.: 14/979,554

(22) Filed: Dec. 28, 2015

(65) Prior Publication Data
US 2016/0136813 A1 May 19, 2016

Related U.S. Application Data

(63) Continuation of application No. PCT/JP2015/071167, filed on Jul. 24, 2015.

(30) Foreign Application Priority Data

Oct. 29, 2014 (JP) ................. 2014-220648
Oct. 29, 2014 (JP) ................. 2014-220650
Oct. 29, 2014 (JP) ................. 2014-220651

(51) Int. Cl.
*G06F 19/00* (2018.01)
*B25J 9/16* (2006.01)
(Continued)

(52) U.S. Cl.
CPC .......... *B25J 9/1664* (2013.01); *B25J 9/0027* (2013.01); *B25J 9/0084* (2013.01); *B25J 9/06* (2013.01);
(Continued)

(58) Field of Classification Search
CPC ...... B25J 9/1664; B25J 9/0027; B25J 9/0084; B25J 9/06; B25J 9/161; Y10S 901/02; Y10S 901/14
(Continued)

(56) References Cited

U.S. PATENT DOCUMENTS 4,604,797 A * 8/1986 Kitamura ............... B23P 19/04
29/430
6,826,452 B1 * 11/2004 Holland .................. B66C 1/663
318/566
(Continued)

FOREIGN PATENT DOCUMENTS

JP 60-123263 7/1985
JP 60-123294 7/1985
(Continued)

OTHER PUBLICATIONS

Extended European Search Report for corresponding EP Application No. 15187280.1-1712, dated May 20, 2016.
(Continued)

*Primary Examiner* — Ronnie M Mancho
(74) *Attorney, Agent, or Firm* — Mori & Ward, LLP

(57) ABSTRACT

A machining apparatus includes a robot including a first arm portion, a second arm portion, a tip portion, a second actuator swinging the first arm portion around a second axis, a third actuator swinging the second arm portion around a third axis, a seventh actuator adjusting a distance between the second axis and the third axis, and an end effector provided to a tip portion and applying machining to a workpiece. The robot is positioned such that a movable range of a tip portion of the first arm portion or a base end portion of the second arm portion interferes with the workpiece when the first arm portion is rotated around the second
(Continued)

axis, where the distance is made longest, in a state where the robot exactly faces the workpiece.

20 Claims, 20 Drawing Sheets

(51) Int. Cl.
*B25J 9/00* (2006.01)
*B25J 9/06* (2006.01)

(52) U.S. Cl.
CPC .............. *B25J 9/161* (2013.01); *Y10S 901/02* (2013.01); *Y10S 901/14* (2013.01)

(58) Field of Classification Search
USPC ........................................................ 700/245
See application file for complete search history.

(56) References Cited

U.S. PATENT DOCUMENTS

| | | | |
|---|---|---|---|
| 2003/0118436 A1 | 6/2003 | Kameda et al. | |
| 2006/0191476 A1* | 8/2006 | Nagase | B05C 1/02 118/258 |
| 2009/0067959 A1* | 3/2009 | Takahashi | B24B 37/345 414/226.01 |
| 2011/0018291 A1 | 1/2011 | Osada et al. | |
| 2011/0118872 A1 | 5/2011 | Ortmaier et al. | |
| 2014/0069335 A1 | 3/2014 | Bania et al. | |

FOREIGN PATENT DOCUMENTS

| | | |
|---|---|---|
| JP | 61-136782 | 6/1986 |
| JP | 02-083191 | 3/1990 |
| JP | 03-079284 | 4/1991 |
| JP | 5-345291 | 12/1993 |
| JP | 06-047689 | 2/1994 |
| JP | 6-42090 U | 6/1994 |
| JP | 2003-205331 | 7/2003 |
| JP | 2005-014108 | 1/2005 |
| JP | 2008-279496 | 11/2008 |
| JP | 2009-016604 | 1/2009 |
| JP | 2009-083094 | 4/2009 |
| JP | 2009-125892 | 6/2009 |
| JP | 2009-220230 | 10/2009 |
| JP | 2009-279677 | 12/2009 |
| JP | 2010-110878 | 5/2010 |
| JP | 2011-519741 | 7/2011 |
| JP | 2013-094948 | 5/2013 |
| JP | 2013-146859 | 8/2013 |
| JP | 2014-061589 | 4/2014 |
| JP | 2015-123516 | 7/2015 |
| JP | 2015-145048 | 8/2015 |

OTHER PUBLICATIONS

International Preliminary Report on Patentability with Written Opinion of the International Searching Authority for corresponding International Application No. PCT/JP2015/071167, dated May 11, 2017.
International Search Report for corresponding International Application No. PCT/JP2015/071167, dated Oct. 13, 2015.
Japanese Office Action for corresponding JP Application No. 2014-220651, dated Oct. 20, 2015.
Japanese Office Action for corresponding JP Application No. 2015-553701, dated Jan. 19, 2016.
Japanese Office Action for corresponding JP Application No. 2014-220648, dated Oct. 20, 2015.
Japanese Office Action for corresponding JP Application No. 2014-220650, dated Oct. 20, 2015.
Japanese Office Action for corresponding JP Application No. 2015-553701, dated Mar. 8, 2016.
Extended European Search Report for corresponding EP Application No. 15810685.6-1018, dated May 3, 2018.

* cited by examiner

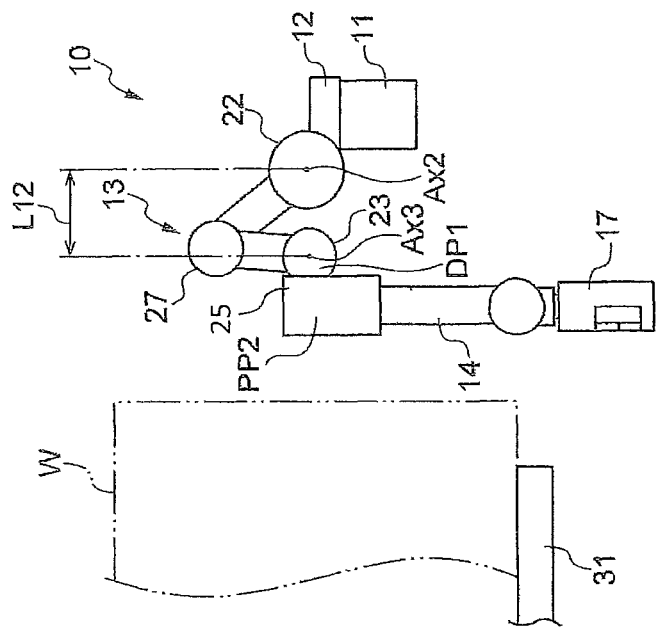
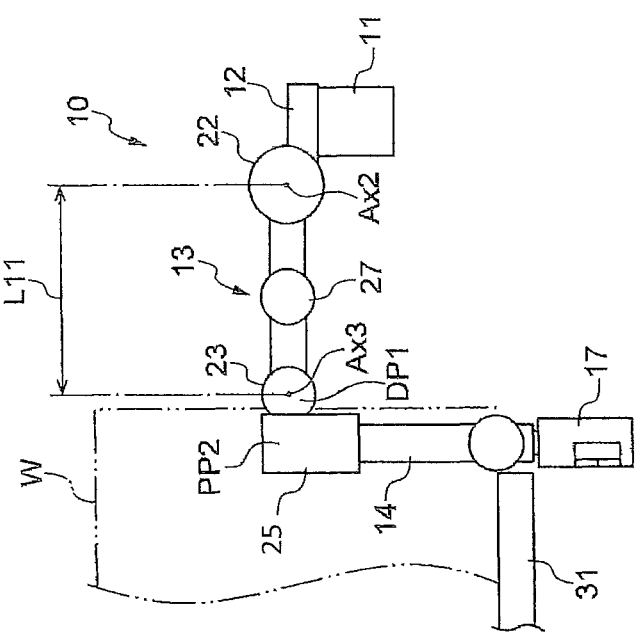

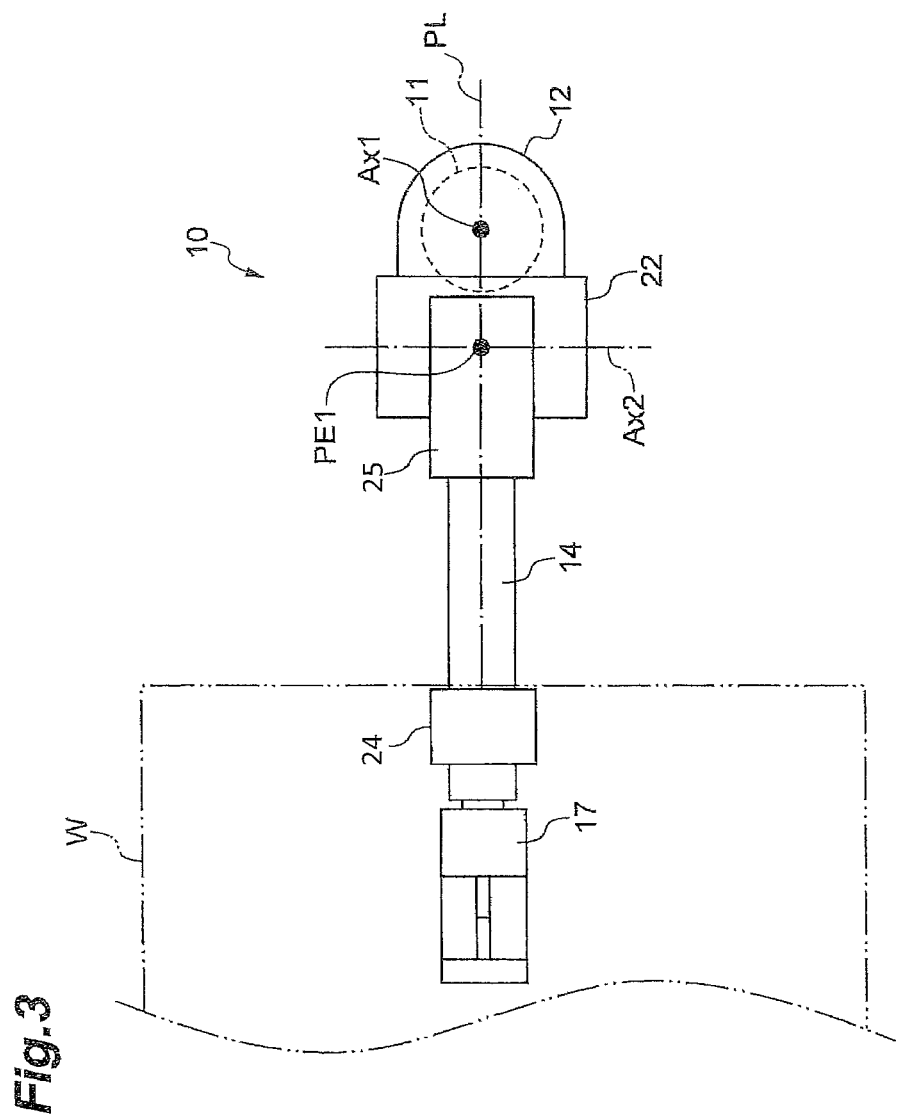

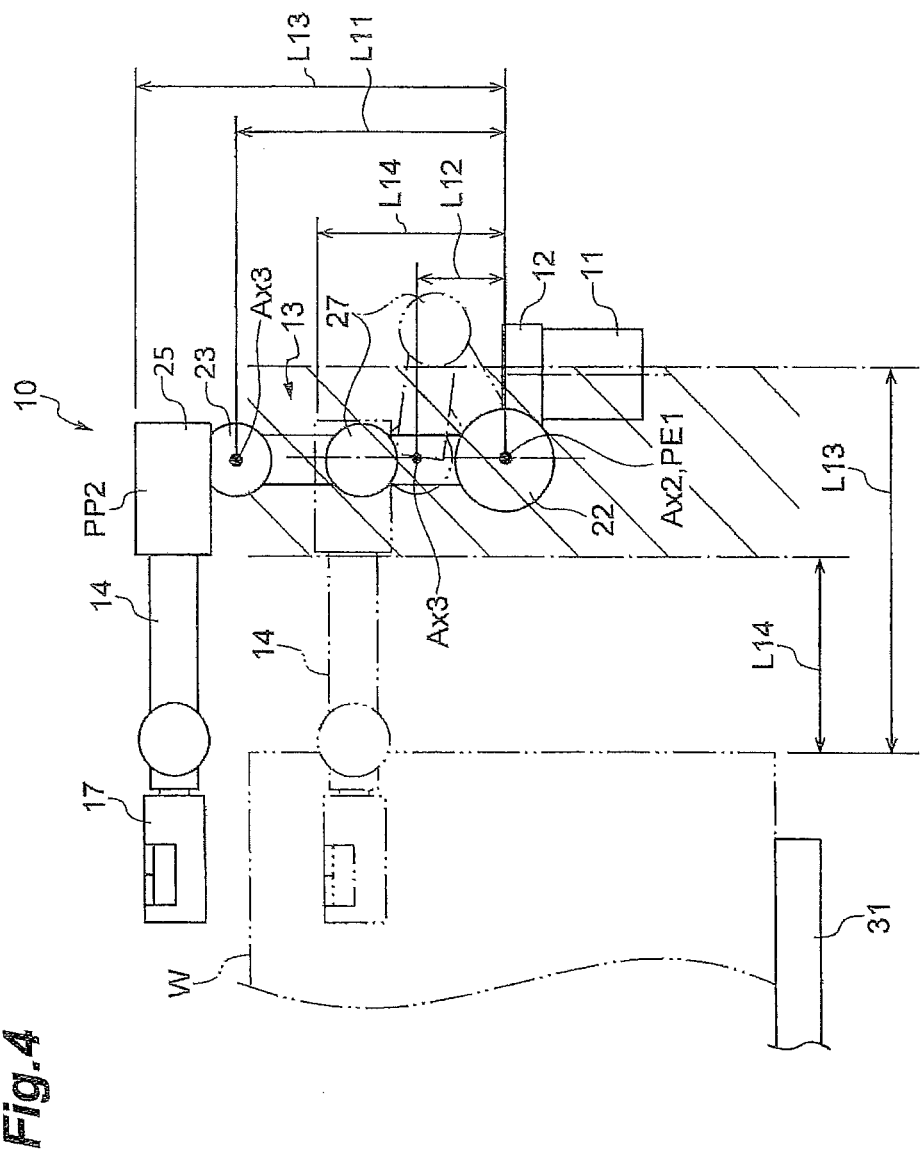

MACHINING APPARATUS AND METHOD OF PRODUCING WORKPIECE

CROSS-REFERENCE TO RELATED APPLICATION

This application is a continuation application of PCT Application No. PCT/JP2015/071167, filed Jul. 24, 2015, the entire contents of which are incorporated herein by reference.

BACKGROUND

1. Field

The present disclosure relates to a machining apparatus and a method of producing a workpiece.

2. Description of the Related Art

JP 2008-279496 A discloses a spot welding device provided with a workpiece fixing table that holds a body panel of a car or the like, as a workpiece, and a robot that applies spot welding to the workpiece.

SUMMARY

A machining apparatus according to the present disclosure includes: a first robot including: a rotating portion, a first arm portion, a second arm portion, a wrist portion, and a tip portion mutually connected in series; a first actuator configured to rotate the rotating portion around a first axis; a second actuator configured to swing the first arm portion around a second axis; a third actuator configured to swing the second arm portion around a third axis; a plurality of posture adjustment actuators configured to adjust a posture of the tip portion; a distance adjustment actuator configured to adjust a distance between the second axis and the third axis; and an end effector provided to the tip portion and configured to apply machining to a workpiece, and the first robot is positioned such that a movable range of a tip portion of the first arm portion or a base end portion of the second arm portion interferes with the workpiece when the first arm portion is rotated around the second axis, where the distance is made longest, in a state where the first robot exactly faces the workpiece.

A method of producing a workpiece according to the present disclosure includes, using the machining apparatus, controlling the first robot to move the end effector to a plurality of portions to be machined of the workpiece, and controlling the first robot to apply machining to the portion to be machined with the end effector in a state where the end effector is arranged to the portion to be machined, controlling the first robot to move the end effector to a plurality of portions to be machined of the workpiece including moving of the end effector between a position higher than a base end of the first arm portion and a position lower than the base end of the first arm portion while changing a distance between the second axis and the third axis with the distance adjustment actuator.

Further exemplary machining apparatus are disclosed as follows:

APPENDICES

1. The above-mentioned machining apparatus, further comprising:
    a conveyance device configured to convey at least one of the workpiece and the first robot to change a relative position of the workpiece and the first robot when the first robot executes machining to the workpiece.

2. The machining apparatus according to appendix 1, wherein the first robot is positioned to be able to apply machining to all of portions to be machined from a side of the first robot without interfering with the workpiece.

3. The machining apparatus according to appendix 1 or 2, wherein the conveyance device conveys the workpiece.

4. The machining apparatus according to any one of appendices 1 to 3, comprising:
    a plurality of the first robots arranged along a conveying direction of the conveyance device.

5. The machining apparatus according to any one of appendices 1 to 4, comprising:
    a plurality of the first robots arranged to sandwich the workpiece in a direction perpendicular to the conveying direction of the conveyance device.

6. The above-mentioned machining apparatus, comprising:
    a plurality of robots including the first robot, and configured to apply machining to a same workpiece in cooperation with each other.

7. The machining apparatus according to appendix 6, wherein the plurality of robots further includes a second robot that has the first to third actuators and the plurality of posture adjustment actuators and does not have the distance adjustment actuator, and the first robot and the second robot are arranged to adjacent to each other.

8. The machining apparatus according to appendix 7, wherein the first robot is configured to apply machining to a more proximal side of the workpiece than the second robot.

9. The machining apparatus according to appendix 7 or 8, wherein the first robot is positioned closer to the workpiece than the second robot.

10. The machining apparatus according to appendix 6, wherein all of the plurality of robots are the first robots.

11. The machining apparatus according to any one of appendices 6 to 10, wherein all of the plurality of robots are fixed to an installation surface.

12. The machining apparatus according to appendix 11, wherein the first robot is arranged such that a movable range of the first robot overlaps with that of adjacent another robot.

BRIEF DESCRIPTION OF THE DRAWINGS

FIGS. 2A and 2B are schematic views illustrating an arrangement condition of a first robot.

FIG. 3 is a plan view illustrating a state in which the first robot exactly faces a workpiece.

FIG. 4 is a schematic view illustrating an arrangement condition of the first robots.

DETAILED DESCRIPTION

Hereinafter, embodiments will be described in detail with reference to the drawings. In the description, the same elements or elements having the same function are denoted with the same reference sign, and overlapping description is omitted.

1. First Embodiment

Machining Apparatus

Figure 1:
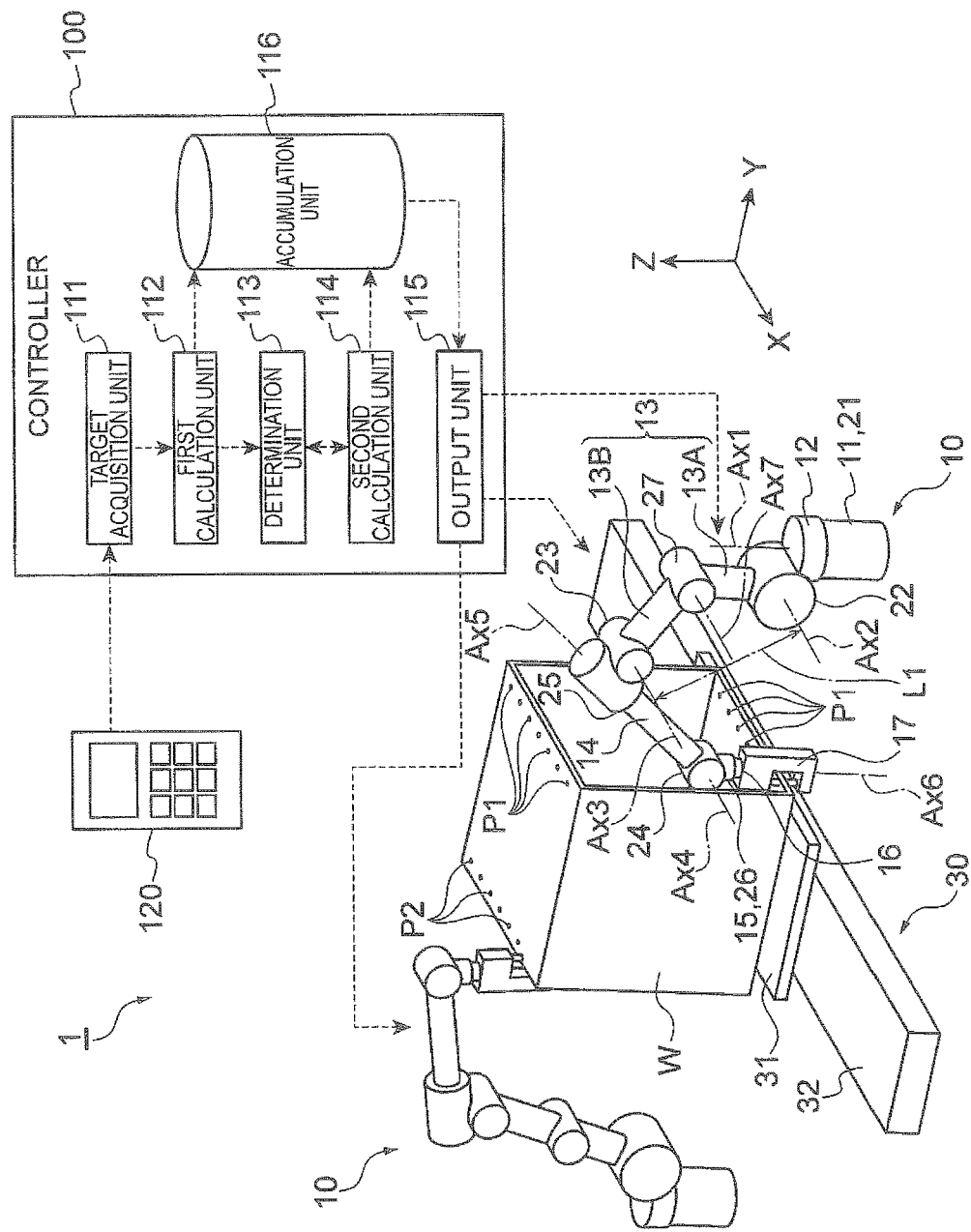
FIG. 1 is a schematic view illustrating a schematic configuration of a machining apparatus according to a first embodiment.

As illustrated in FIG. 1, a machining apparatus 1 includes two robots 10 (first robots), a controller 100, and a programming pendant 120.

(Robot)

The robots 10 perform machining of a workpiece W of a body of an automobile. As an example, the robot 10 includes a base 11, a rotating portion 12, a first arm portion 13, a second arm portion 14, a wrist portion 15, a tip portion 16, an end effector 17, a first actuator 21, a second actuator 22, a third actuator 23, a fourth actuator 24, a fifth actuator 25, a sixth actuator 26, and a seventh actuator 27.

The base 11 is fixed to a floor surface (installation surface), and supports the entire robot 10. That is, all of the plurality of robots 10 are fixed to the installation surface.

The rotating portion 12, the first arm portion 13, the second arm portion 14, the wrist portion 15, and the tip portion 16 are mutually connected in series. The rotating portion 12 is provided to the base 11, and is rotatable around a vertical first axis Ax1 (along a z axis in the drawing). In the description below, a "tip" means an end of a side of the tip portion 16, and a "tip portion" means a tip and a portion in the vicinity of the tip. A "base end" means an end of a side of the base 11, and a "base end portion" means a base end and a portion in the vicinity of the base end.

The first arm portion 13 is swingable around a horizontal second axis Ax2 that passes through a connecting portion of the rotating portion 12 and the first arm portion 13.

The second arm portion 14 is swingable around a horizontal third axis Ax3 that passes through a connecting portion of the first arm portion 13 and the second arm portion 14. The third axis Ax3 is parallel to the second axis Ax2. The second arm portion 14 is rotatable around a fifth axis Ax5 along a central axis.

The wrist portion 15 is swingable around a fourth axis Ax4 that passes through a connecting portion of the second arm portion 14 and the wrist portion 15.

The tip portion 16 is rotatable around a sixth axis Ax6 along a central axis of the wrist portion 15.

The end effector 17 is a spot welding device, for example, and is provided to the tip portion 16. As an example, the end effector 17 is detachably attached to the tip portion 16, and is exchangeable with another end effector. The end effector 17 may be integrated with the tip portion 16. The end effector 17 may be any tool as long as the tool is a tool for machining, and is not limited to the spot welding device. For example, the end effector 17 may be an arc welding device or a cutter, a screwing device, or the like for workpiece other than welding.

Here, the first arm portion 13 is configured from links 13A and 13B that are mutually connected in series. The link 13A is connected to the rotating portion 12, and the link 13B is connected to the second arm portion 14. The first arm portion 13 is bendable around a seventh axis Ax7 that passes through a connecting portion of the links 13A and 13B. In other words, the link 13B is swingable around the seventh axis Ax7 that passes through the connecting portion of the links 13A and 13B. The seventh axis Ax7 is parallel to the second axis Ax2 and the third axis Ax3.

The first actuator 21 is provided to the base 11, for example, and rotates the rotating portion 12 around the first axis Ax1.

The second actuator 22 is provided to the rotating portion 12, for example, and swings the first arm portion 13 around the second axis Ax2.

The third actuator 23 is provided to a tip portion of the first arm portion 13, for example, and swings the second arm portion 14 around the third axis Ax3.

The fifth actuator 25 is provided to a base end portion of the second arm portion 14, for example, and rotates the second arm portion 14 around the fifth axis Ax5. Since the wrist portion 15 is connected to the second arm portion 14, rotating of the second arm portion 14 corresponds to rotating of the wrist portion 15. That is, the fifth actuator 25 rotates the wrist portion 15 around the fifth axis Ax5.

The fourth actuator 24 is provided to a tip portion of the second arm portion 14, for example, and swings the wrist portion 15 around the fourth axis Ax4.

The sixth actuator 26 is provided to the wrist portion 15, for example, and rotates the tip portion 16 around the sixth axis Ax6.

The fourth actuator 24, the fifth actuator 25, and the sixth actuator 26 are an example of a plurality of posture adjustment actuators that adjusts the posture of the tip portion 16.

The seventh actuator 27 (distance adjustment actuator) adjusts a distance L1 between the second axis Ax2 and the third axis Ax3. As illustrated in FIGS. 2A and 2B, the seventh actuator 27 adjusts the distance L1 between a longest distance L11 and a shortest distance L12.

As illustrated in FIG. 1, the seventh actuator 27 is provided to a tip portion of the link 13A, and bends the first arm portion 13 around the seventh axis Ax7. In other words, the seventh actuator 27 swings the link 13B around the seventh axis Ax7. In this configuration, the longest distance L1 is the distance L1 in a state where the first arm portion 13 is not bent (a state where the link 13B is not inclined with respect to the link 13A). The shortest distance L12 is the distance L1 in a state where the first arm portion 13 is bent to the movable limit of the seventh actuator 27.

The seventh actuator 27 is not necessarily the one that bend the first arm portion 13, and any actuator may be employed as long as the actuator can adjust the distance L1 between the second axis Ax2 and the third axis Ax3. For example, the seventh actuator 27 may be a direct acting actuator that expands/contracts the first arm portion 13.

As described above, the robot 10 is configured by adding redundant degree of freedom for adjusting the distance L1 between the second axis Ax2 and the third axis Ax3 to a so-called 6-axis robot in which position and posture of the tip portion 16 are freely changeable. The actuators 21 to 26 are configured from electric servo motors, gear heads, brakes, and the like. The servo motors, gear heads, brakes, and the like are not necessarily arranged on the axes Ax1 to Ax7, and may be arranged in positions separated from these axes.

(Conveyance Device)

The machining apparatus 1 may further include a conveyance device 30. The conveyance device 30 conveys the workpiece W to change a relative position of the workpiece W and the robot 10. As an example, the conveyance device 30 includes a pallet 31 (workpiece arranging portion) and a conveyance actuator 32. The pallet 31 supports the workpiece W. The conveyance actuator 32 conveys the pallet 31 along a horizontal straight line (along an x axis illustrated in the drawing), using an electric motor or a hydraulic motor as a power source.

(Arrangement of Robot)

As illustrated in FIG. 2A, the robot 10 is positioned to cause a movable range of the tip portion DP1 of the first arm portion 13 or the base end portion PP2 of the second arm portion 14 to interfere with the workpiece W when the first arm portion 13 is rotated around the second axis Ax2, where the distance L1 is the longest distance L11, in a state where the robot 10 exactly faces the workpiece W (hereinafter, this condition is referred to as "arrangement condition 1"). That is, at least a part of the movable range (moving locus) of the tip portion DP1 of the first arm portion 13 or the base end portion PP2 of the second arm portion 14 overlaps at least a part of an area occupied by the workpiece W. In other words, at least a part of the workpiece W is included in the movable range of the tip portion DP1 of the first arm portion 13 or the base end portion PP2 of the second arm portion 14.

As illustrated in FIG. 2B, the robot 10 may be positioned to cause the movable range of the tip portion DP1 of the first arm portion 13 and the base end portion PP2 of the second arm portion 14 not to interfere with the workpiece W when the first arm portion 13 is rotated around the second axis Ax2, where the distance L1 is the shortest distance L12, in a state where the robot 10 exactly faces the workpiece W (hereinafter, this condition is referred to as "arrangement condition 2").

Note that the "exactly face" means a state in which the base end PE1 (an intersection point of the central axis of the first arm portion 13 and the second axis Ax2) of the first arm portion 13 is positioned between the first axis Ax1 and the workpiece W in plan view, and is positioned on a perpendicular line PL from the first axis Ax1 to the workpiece W, as illustrated in FIG. 3.

A detailed condition for satisfying the arrangement condition 1, 2 will be exemplarily described with reference to FIG. 4. As illustrated in FIG. 4, the robot 10 may be positioned to cause a distance from the workpiece W to the base end PE1 of the first arm portion 13 to become less than a third length L13, in a state where the robot 10 exactly faces the workpiece W (hereinafter, this condition is referred to as "arrangement condition 1a"). The third length L13 is a distance from the base end PE1 of the first arm portion 13 to a distal portion on an external peripheral surface of the second arm portion 14, in a state where the second arm portion 14 is vertical to a straight line perpendicular to the second axis Ax2 and the third axis Ax3, where the distance L1 is the longest distance L11. The "distal portion on the external peripheral surface of the second arm portion 14" is a portion at an opposite side to the second axis Ax2, of the external peripheral surface of the second arm portion 14. When the arrangement of the robot 10 satisfies the arrangement condition 1a, the arrangement condition 1 is also satisfied.

The robot 10 may be positioned to cause the distance from the workpiece W to the base end PE1 of the first arm portion 13 to exceed a fourth length L14, in a state where the robot 10 exactly faces the workpiece W (hereinafter, this condition is referred to as "arrangement condition 2a"). The fourth length L14 is a distance from the base end PE1 of the first arm portion 13 to the distal portion of the external peripheral surface of the second arm portion 14, in a state where the second arm portion 14 is vertical to the straight line perpendicular to the second axis Ax2 and the third axis Ax3, where the distance L1 is the shortest distance L12. When the arrangement of the robot 10 satisfies the arrangement condition 2a, the arrangement condition 2 is also satisfied.

Figure 5:
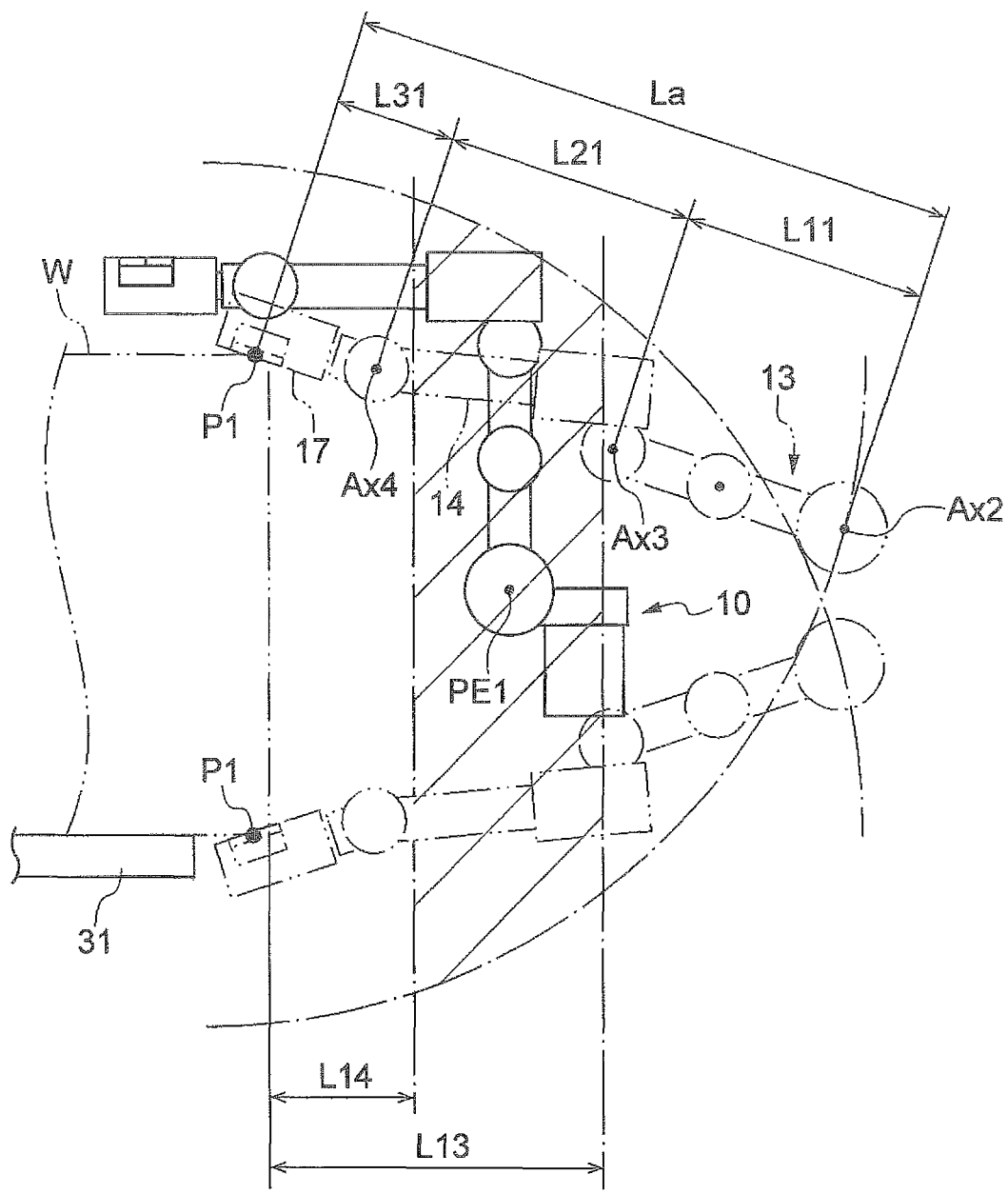
FIG. 5 is a schematic view illustrating another arrangement condition of the first robots.

As illustrated in FIG. 5, the robot 10 may be positioned such that a distance from a highest portion to be machined P1 in the workpiece W to the base end PE1 of the first arm portion 13, and a distance from a lowest portion to be machined P1 in the workpiece to the base end PE1 of the first arm portion 13 become a length La obtained by a formula (1) or less, in a state where the robot 10 exactly faces the workpiece W.

$$La = L11 + L21 + L31 \quad (1)$$

L11: the longest distance from the second axis Ax2 to the third axis Ax3

L21: the distance from the third axis Ax3 to the fourth axis Ax4

L31: the distance from the fourth axis Ax4 to the end effector 17

Note that the "distance to the end effector 17" means a distance to a portion of the end effector 17, the portion acting on the portion to be machined P1 (hereinafter, referred to as "acting portion").

Figure 6:
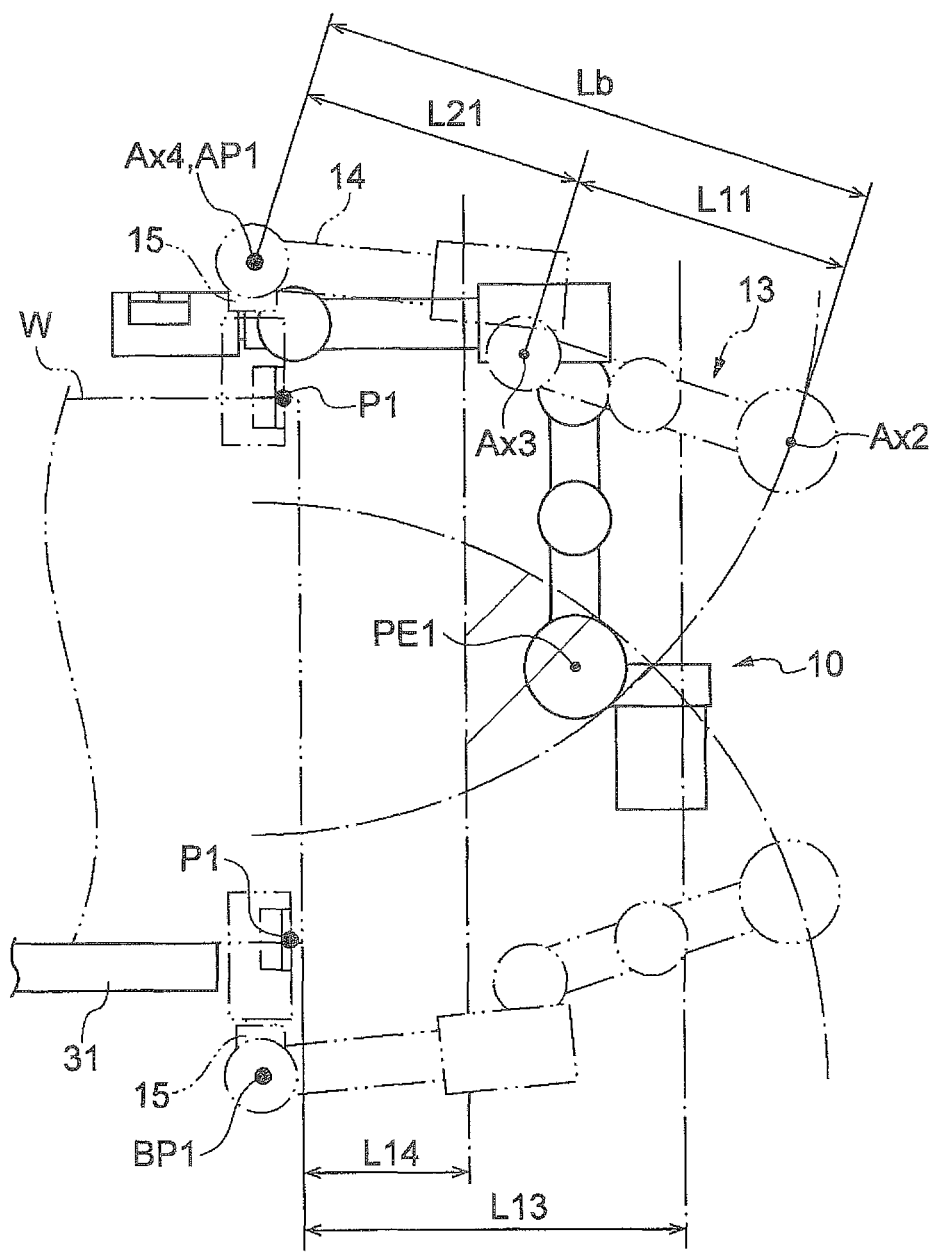
FIG. 6 is a schematic view illustrating still another arrangement condition of the first robots.

As illustrated in FIG. 6, the robot 10 may be positioned such that a distance from the position of the fourth axis Ax4 to the base end PE1 of the first arm portion 13 when the end effector 17 is arranged to be able to apply machining to the highest portion to be machined P1 in the workpiece W, and the distance from the position of the fourth axis Ax4 to the base end PE1 of the first arm portion 13 when the end effector 17 is arranged to be able to apply machining to the lowest portion to be machined P1 in the workpiece W become a length Lb obtained by a formula (2) or less, in a state where the robot 10 exactly faces the workpiece W.

$$Lb = L11 + L21 \quad (2)$$

Arrangement of the end effector 17 to the portion to be machined P1 means arrangement of the acting portion of the end effector 17 to the portion to be machined P1. A posture of the end effector 17 by which machining can be applied to the portion to be machined P1 is determined in accordance with a state of the portion to be machined P1. For example, when the end effector 17 is a spot welding device, the posture of the end effector 17 is determined to be able to sandwich an object to be welded with electrodes. As an example, FIG. 6 exemplarily illustrates a case in which the posture of the end effector 17 by which machining can be applied to the portion to be machined P1 is vertical (a case in which the central axis of the wrist portion 15 extends along a vertical axis). In consideration of such a case, the robot 10 may be positioned such that the distance from the position of the fourth axis Ax4 to the base end PE1 of the first arm portion 13 when the wrist portion 15 is oriented downward in the vertical direction and the end effector 17 is arranged to the highest portion to be machined P1 in the workpiece W, and the distance from the position of the fourth axis Ax4 to the base end PE1 of the first arm portion 13 when the wrist portion 15 is oriented upward in the vertical direction and the end effector 17 is arranged to the lowest portion to be machined P1 in the workpiece W, in a state where the robot 10 exactly faces the workpiece W become a length Lb obtained by the formula (2) or less.

Figure 7:
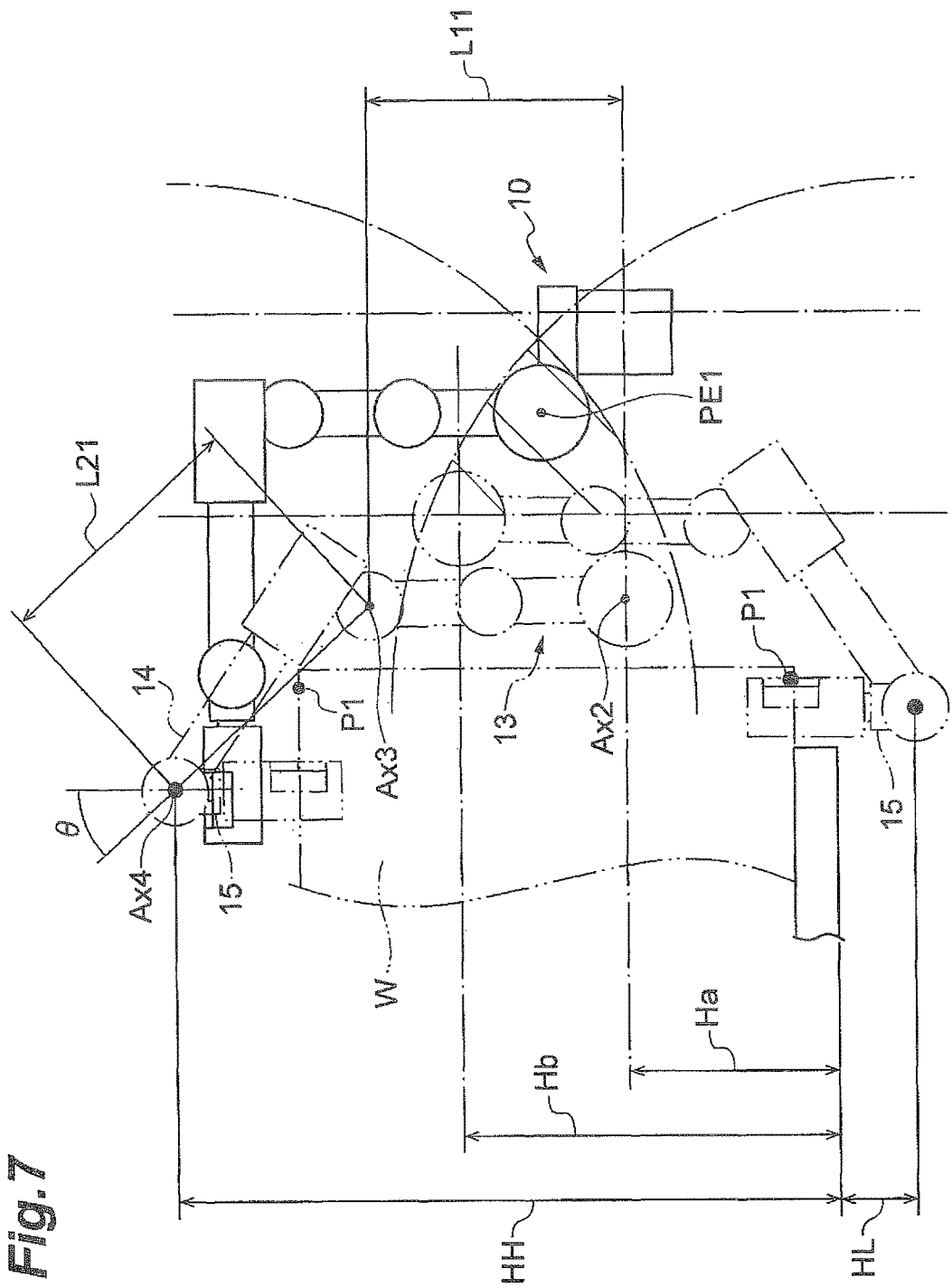
FIG. 7 is a schematic view illustrating still another arrangement condition of the first robots.

As illustrated in FIG. 7, the robot 10 may be positioned to cause the height of the base end PE1 of the first arm portion 13 to become a height Ha obtained by a formula (3) or more.

$$Ha=HH-L21\cdot\cos\theta-L11 \quad (3)$$

HH: the height of the fourth axis when the wrist portion is oriented downward in the vertical direction and the end effector is positioned to the highest portion to be machined in the workpiece θ: the minimum value of an angle made by a straight line perpendicular to the third axis Ax3 and the fourth axis Ax4, and the central axis of the wrist portion 15

Note that the "minimum value of an angle" means a minimum value in the movable range.

The robot 10 may be positioned to cause the height of the base end PE1 of the first arm portion 13 to become a height Hb obtained by a formula (4) or less.

$$Hb=HL+L21\cdot\cos\theta+L11 \quad (4)$$

Figure 8:
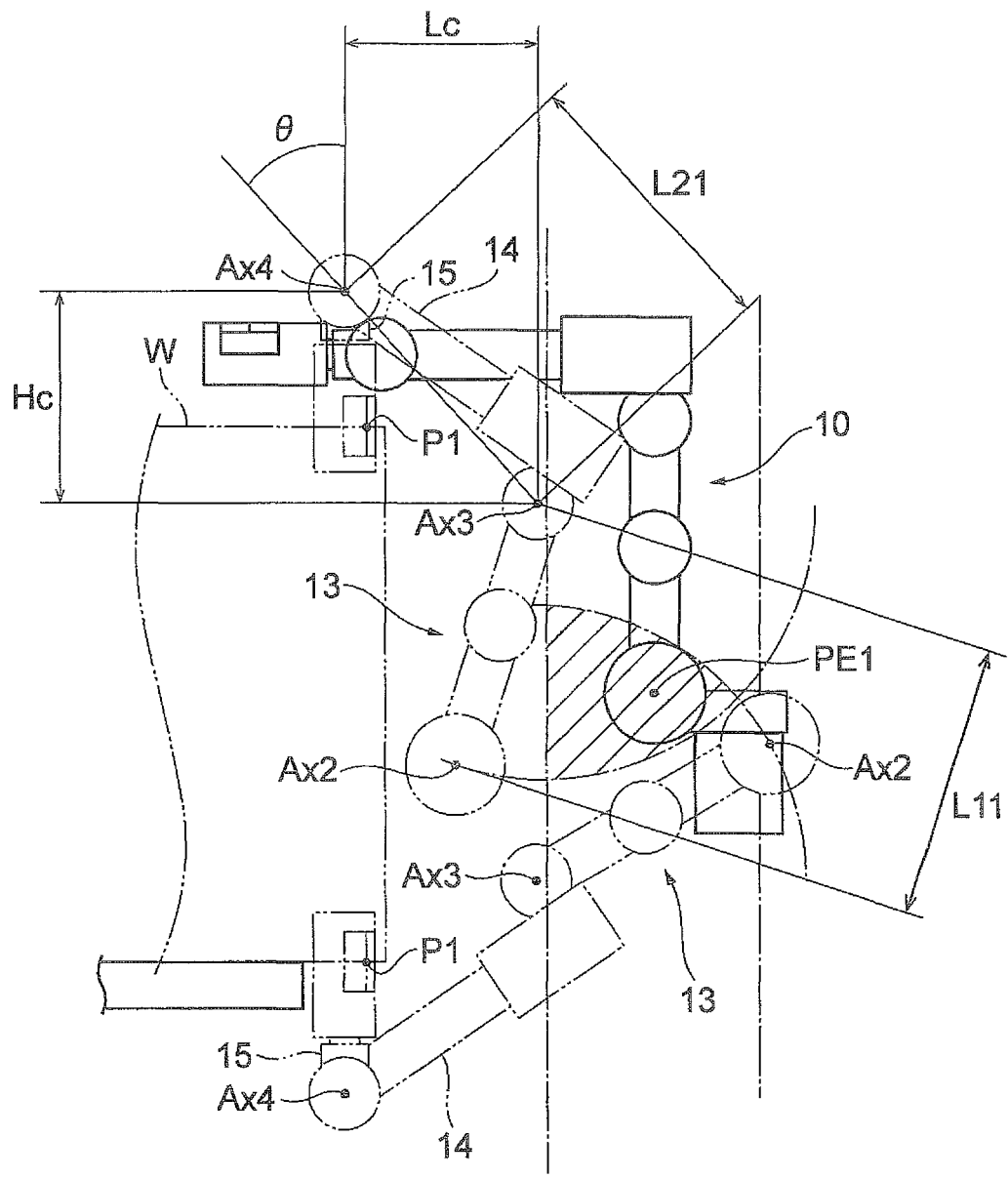
FIG. 8 is a schematic view illustrating still another arrangement of the first robots.

HL: the height of the fourth axis when the wrist portion is oriented upward in the vertical direction, and the end effector is arranged to the lowest portion to be machined in the workpiece As illustrated in FIG. 8, the robot 10 may be positioned such that a distance from a position to the base end PE1 of the first arm portion 13, the position being obtained such that the position of the fourth axis Ax4 when the wrist portion 15 is oriented downward in the vertical direction and the end effector 17 is positioned to the highest portion to be machined P1 in the workpiece W is shifted to a front side by a distance Lc obtained by a formula (5), and is shifted downward by a height Hc obtained by a formula (6), and a distance from a position to the base end PE1 of the first arm portion 13, the position being obtained such that the position of the fourth axis Ax4 when the wrist portion 15 is oriented upward in the vertical direction and the end effector 17 is arranged to the lowest portion to be machined P1 in the workpiece W is shifted to the front side by the distance Lc obtained by the formula (5), and is shifted by the height Hc obtained by the formula (6) become the longest distance L11 or less, in a state where the robot 10 exactly faces the workpiece W.

$$Lc=L21\cdot\sin\theta \quad (5)$$

$$Hc=L21\cdot\cos\theta \quad (6)$$

The two robots 10 are arranged to sandwich the workpiece W in the direction (along the y axis in the drawing) perpendicular to a conveying direction (along the x axis in the drawing) by the conveyance device 30. Hereinafter, a positive direction of the y axis in the drawing is a "left direction", and a negative direction of the y axis in the drawing is a "right direction". The robot 10 on the left side performs machining to the portion to be machined P1 on the left side of the workpiece W and the robot 10 on the right side performs machining to a portion to be machined P2 on the right side of the workpiece W.

The robot 10 on the left side is arranged to be able to apply machining to all of the portions to be machined P1 from the robot 10 side (the left side) without interfering with the workpiece W. As an example, the robot 10 on the left side is arranged to cause the end effector 17 to reach both of the uppermost portion to be machined P1 and the lowermost portion to be machined P1 without interfering with the workpiece W.

The robot 10 on the right side is arranged to be able to apply machining to all of the portions to be machined P2 from the robot 10 side (the right side) without interfering with the workpiece W. As an example, the robot 10 on the right side is arranged to cause the end effector 17 to reach both of the uppermost portion to be machined P2 and the lowermost portion to be machined P2 without interfering with the workpiece W.

(Controller and Programming Pendant)

The controller 100 is a device that controls the two robots 10 and the conveyance device 30. The programming pendant 120 is a device that inputs/outputs data to/from the controller 100 by wired or wireless means.

The controller 100 includes a target acquisition unit 111, a first calculation unit 112, a determination unit 113, a second calculation unit 114, an output unit 115, and an accumulation unit 116, as functional configurations.

The accumulation unit 116 accumulates operation patterns of the robots 10. The operation patterns are time series data of operation target values of the actuators 21 to 27, for example.

The target acquisition unit 111 acquires target values of position/posture of the tip portion 16 from the programming pendant 120. The target values of the position/posture acquired by the target acquisition unit 111 may be input to the programming pendant 120 by the user or may be read from a recording medium through the programming pendant 120.

The first calculation unit 112 calculates the operation target values of the actuators 21 to 26 corresponding to the target values of the position/posture in a condition where the operation target value of the seventh actuator 27 for distance adjustment is fixed to an initial value, and stores the operation target values of the actuators 21 to 27 in the accumulation unit 116.

The operation target value of the seventh actuator 27 is a target value of an operation amount by which the distance L1 between the second axis Ax2 and the third axis Ax3 is adjusted, and is a target value of a bending angle of the first arm portion 13, for example. An initial value of the bending angle of the first arm portion is, for example, 0°.

The operation target value of the first actuator 21 is a target value of a rotating angle of the rotating portion 12, for example. The operation target value of the second actuator 22 is a target value of a swing angle of the first arm portion 13, for example. The operation target value of the third actuator 23 is a target value of a swing angle of the second arm portion 14. The operation target value of the fifth actuator 25 is a target value of a rotating angle of the wrist portion 15, for example. The operation target value of the fourth actuator 24 is a target value of a swing angle of the wrist portion 15, for example. The operation target value of the sixth actuator 26 is a target value of a rotating angle of the tip portion 16.

The operation target values of the actuators 21 to 26 are calculated by inverse kinematics calculation, for example. The first calculation unit 112 stores calculation results of the operation target values of the actuators 21 to 27 in the accumulation unit 116.

The determination unit 113 determines whether the operation target values stored in the accumulation unit 116 are outputtable. For example, the determination unit 113 determines that the operation target values are not outputtable in a case where interference is caused between the robots 10 and the workpiece W when the actuators 21 to 27 are operated with the operation target values stored in the accumulation unit 116.

The determination unit 113 may also determine that the operation target values are not outputtable in a case where the operation target value of an actuator to be determined calculated by the first calculation unit 112 falls outside an allowable range where at least one of the actuators 21 to 26 is the actuator to be determined. The determination unit 113 may have all of the actuators 21 to 26 as the actuators to be determined, or may have only a part of the actuators 21 to 26 (for example, only the second actuator 22, the third actuator 23, and the fourth actuator 24) as the actuators to be determined. The determination unit 113 may have only the third actuator 23 and the fourth actuator 24 as the actuators to be determined, or may have only at least one of the third actuator 23 and the fourth actuator 24 as the actuator to be determined. The allowable range is set such that the operation amount of a portion driven by the actuator to be determined falls within the movable range. For example, when the third actuator 23 is the actuator to be determined, the allowable range of the operation target value of the third actuator 23 is set such that the swing angle of the second arm portion 14 falls within the movable range.

The second calculation unit 114 modifies the operation target values of the actuators 21 to 27 to become outputtable when the operation target values are determined not to be outputtable by the determination unit 113. For example, the second calculation unit 114 modifies the operation target values of the actuators 21 to 27 to make the distance L1 between the second axis Ax2 and the third axis Ax3 small to avoid the interference between the robots 10 and the workpiece W when generation of the interference between the robots 10 and the workpiece W is determined by the determination unit 113. To be specific, the second calculation unit 114 may set a constraint condition to avoid the interference between the robots 10 and the workpiece W, and modify the operation target values of the actuators 21 to 27 by inverse kinematics calculation to which the constraint condition is applied.

The second calculation unit 114 may modify the operation target values of the actuators 21 to 27 to cause the operation target values to fall within the allowable range when the operation target value of at least one actuator to be determined falls outside the allowable range. To be specific, the second calculation unit 114 may set the constraint condition such that the operation target value of the actuator, which has the operation target value falling outside the allowable range, falls within the allowable range, and then modify the operation target ranges of the actuators 21 to 27 by the inverse kinematics calculation to which the constraint condition is applied.

The second calculation unit 114 may set the constraint condition such that the first arm portion 13 is bent in a direction into which the seventh axis Ax7 for distance adjustment is away from the workpiece W, and calculate the operation target values of the actuators 21 to 27.

The second calculation unit 114 stores calculation results of the operation target values of the actuators 21 to 27 in the accumulation unit 116 to overwrite immediately preceding calculation results.

The output unit 115 controls the actuators 21 to 27 in accordance with the operation target values. To be specific, the output unit 115 controls the actuators 21 to 27 such that the operation amounts of respective units by the actuators 21 to 27 are approximately matched with the set operation target values. The output unit 115 also controls the conveyance actuator 32, in addition to the actuators 21 to 27.

The controller 100 may just be configured to execute: acquisition of the target values of the position/posture of the tip portion 16; calculation of the operation target values of the actuators 21 to 26 corresponding to the target values of the position/posture in the condition in which the operation target value of the seventh actuator 27 for distance adjustment is fixed; determination of whether the calculated operation target values are outputtable; modification of the operation target values of the actuators 21 to 27 to become outputtable when the operation target values are determined not to be outputtable; and controlling the actuators 21 to 27 in accordance with the operation target values. Therefore, a hardware configuration of the controller 100 is not necessarily separated into the target acquisition unit 111, the first calculation unit 112, the determination unit 113, the second calculation unit 114, the output unit 115, and the accumulation unit 116.

Figure 9:
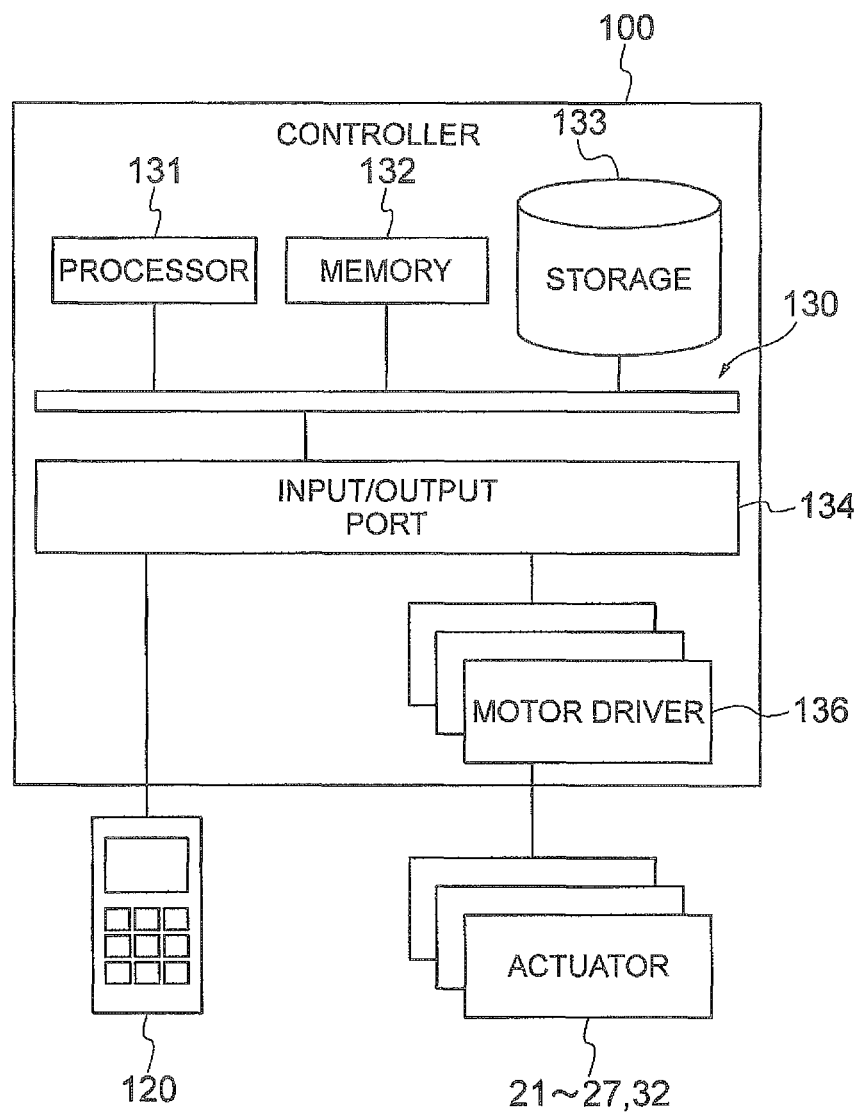
FIG. 9 is a hardware configuration diagram of a controller.

FIG. 9 is a diagram illustrating an example of the hardware configuration of the controller 100. The controller 100 exemplarily illustrated in FIG. 9 includes a circuitry 130. The circuitry 130 includes a processor 131, a memory 132, a storage 133, an input/output port 134, and a plurality of motor drivers 136. The input/output port 134 inputs/outputs data to/from the programming pendant 120 and the plurality of motor drivers 136. The plurality of motor drivers 136 respectively controls the actuators 21 to 27 and the conveyance actuators 32 of the two robots 10. The processor 131 executes a program in cooperation with at least one of the memory 132 and the storage 133, and inputs/outputs data through the input/output port 134, thereby to cause the controller 100 to function as the target acquisition unit 111, the first calculation unit 112, the determination unit 113, the second calculation unit 114, the output unit 115, and the accumulation unit 116.

The hardware configuration of the controller 100 is not necessarily limited to one that forms the respective functions by execution of the program. For example, at least a part of the target acquisition unit 111, the first calculation unit 112, the determination unit 113, the second calculation unit 114, the output unit 115, and the accumulation unit 116 may be configured from logic circuits specializing in the functions, or may be configured from an application specific integrated circuit (ASIC) in which the logic circuits are integrated.

[Control Method]

Next, a procedure of controlling the robots 10 and the conveyance device 30 by the controller 100 will be described as an example of a control method according to the present disclosure.

(Outline of Control Procedure)

Figure 10:
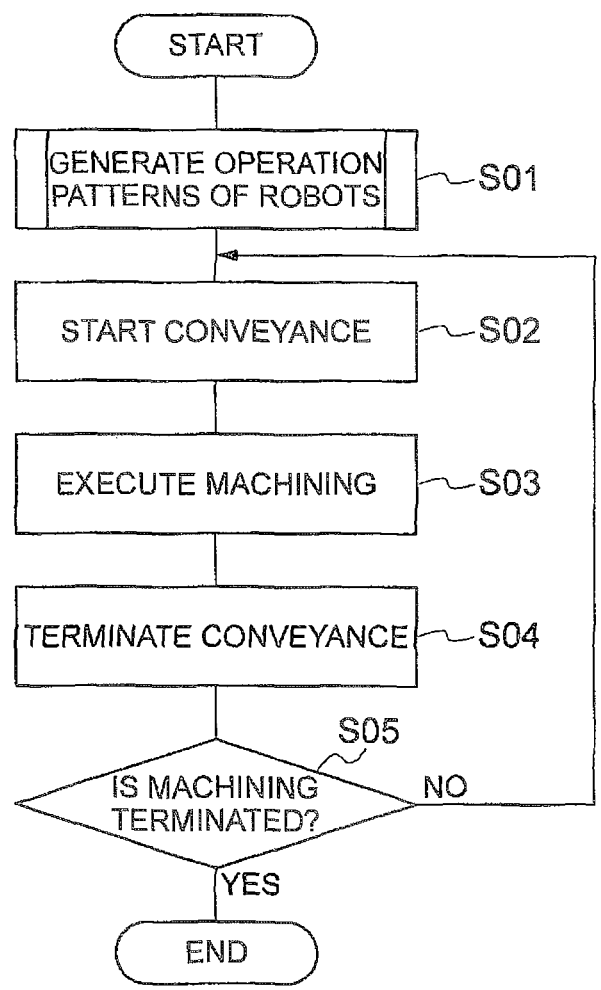
FIG. 10 is a flowchart illustrating a machining procedure, using the first robot.

As illustrated in FIG. 10, first, the controller 100 executes step S01. In step S01, at least one of the first calculation unit 112 and the second calculation unit 114 stores the calculation results of the operation target values of the actuators 21 to 27 in the accumulation unit 116, and constructs the operation patterns of the two robots 10. The operation patterns of the two robots 10 are constructed to apply machining to the workpiece W.

Next, the controller 100 executes steps S02 to S04. In step S02, the output unit 115 controls the conveyance actuator 32 to start conveyance of the workpiece W. In step S03, the output unit 115 controls the two robots 10 to execute machining of the workpiece W. That is, the output unit 115 controls the actuators 21 to 27 of the two robots 10 in accordance with the operation target values stored in the accumulation unit 116. In step S04, the output unit 115 controls the conveyance actuator 32 to terminate the conveyance of the workpiece W.

Next, the controller 100 executes step S05. In step S05, the output unit 115 determines whether a command of termination of machining has been input. The command of termination of machining is input through the programming pendant 120, for example. When the command of termination of machining has not been input, the controller 100 returns the processing to step S02. Accordingly, the same machining procedure is repeated. When the command of termination of machining has been input, the controller 100 terminates the processing.

(Procedure of Generating Operation Pattern)

Figure 11:
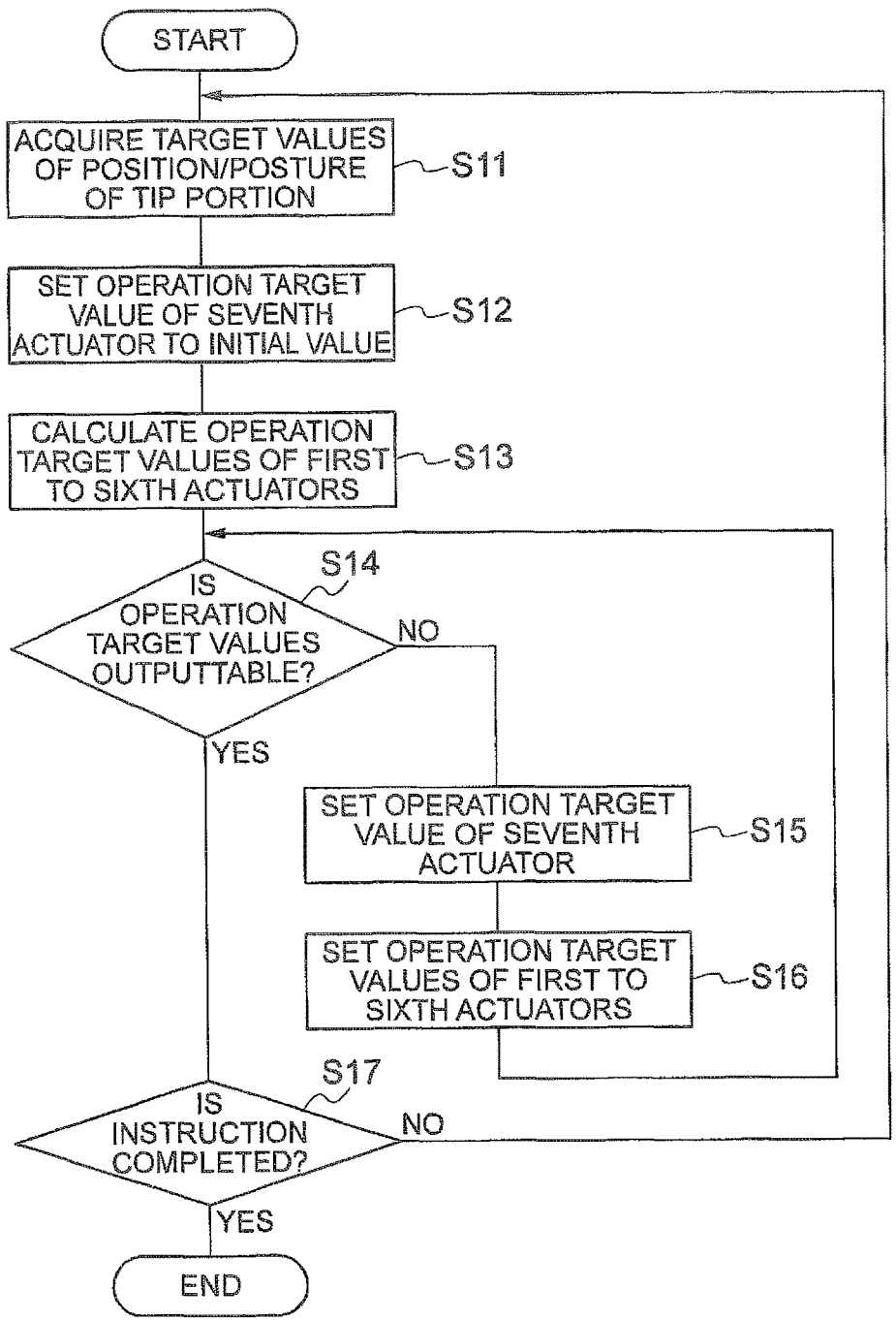
FIG. 11 is a flowchart illustrating a generation procedure of an operation pattern.
Figure 12A:
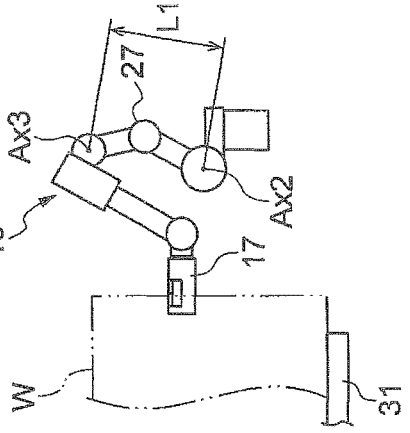
FIGS. 12A to 12F are schematic views illustrating postures of the first robot during execution of machining.
Figure 12B:
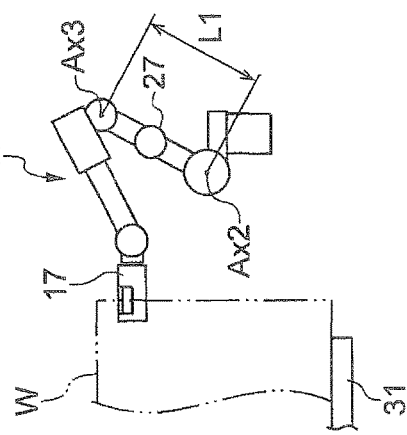
Figure 12C:
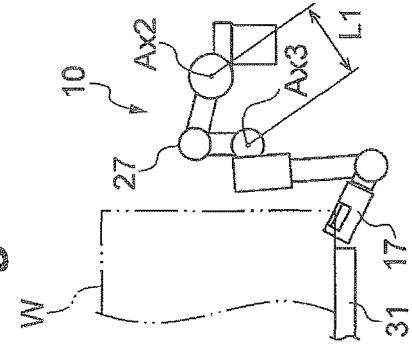
Figure 12D:
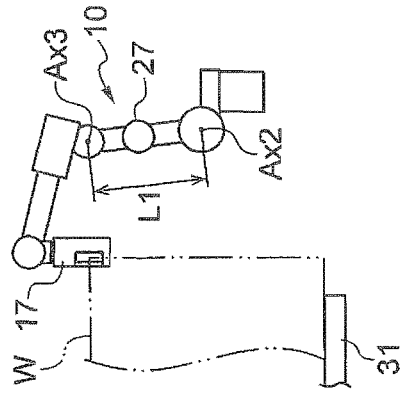
Figure 12E:
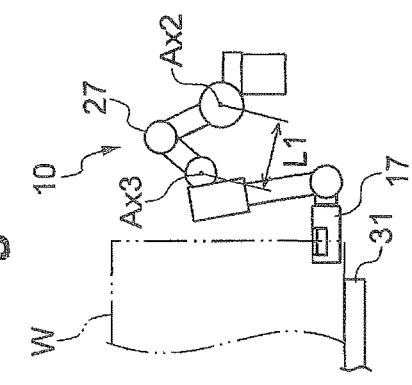
Figure 12F:
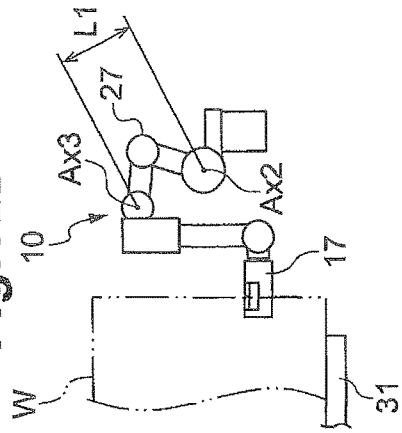

Next, a procedure of generating the operation pattern in step S01 will be described in more detail. As illustrated in FIG. 11, first, the controller 100 executes step S11. In step S11, the target acquisition unit 111 acquires the target values of the position/posture of the tip portion 16 from the programming pendant 120.

Next, the controller 100 executes steps S12 and S13. In step S12, the first calculation unit 112 sets the operation target value of the seventh actuator 27 for distance adjustment to the initial value. For example, the first calculation unit 112 sets the bending angle of the first arm portion 13 to 0°. In step S13, the first calculation unit 112 calculates the operation target values of the actuators 21 to 26 corresponding to the target values of the position/posture in the condition where the operation target value of the seventh actuator 27 is fixed to the initial value, and stores the calculation results of the actuators 21 to 27 in the accumulation unit 116.

Next, the controller 100 executes step S14. In step S14, the determination unit 113 determines whether the operation target values stored in the accumulation unit 116 are outputtable. For example, the determination unit 113 determines that the operation target values are not outputtable when the interference is caused between the robots 10 and the workpiece W when the actuators 21 to 27 are operated with the operation target values stored in the accumulation unit 116.

The determination unit 113 may determine that the operation target values are not outputtable also when the operation target value of the actuator to be determined falls outside the allowable range where at least one of the actuators 21 to 26 is the actuator to be determined.

In step S14, when the operation target values are determined not to be outputtable, the controller 100 executes steps S15 and S16.

In step S15, the second calculation unit 114 sets the operation target value of the seventh actuator 27 to cause the operation target values to become outputtable. For example, the second calculation unit 114 sets the operation target value of the seventh actuator 27 to make the distance L1 short to avoid the interference between the robots 10 and the workpiece W. The second calculation unit 114 may set the operation target value of the seventh actuator 27 to cause other actuators to share a part of the operation target values that fall outside the allowable range.

In step S16, the second calculation unit 114 calculates the operation target values of the actuators 21 to 26 corresponding to the target values of the position/posture in a condition where the operation target value of the seventh actuator 27 is fixed to the set value in step S15. The second calculation unit 114 stores the calculation results of the operation target values of the actuators 21 to 27 in the accumulation unit 116, and overwrites the immediately preceding calculation results.

Subsequently, the controller 100 returns the processing to step S14. Accordingly, steps S14 and S15 are repeated until when the operation target values become outputtable.

In steps S15 and S16, the second calculation unit 114 may calculate the operation target values of the actuators 21 to 27 such that the first arm portion 13 is bent in the direction into which the seventh axis Ax7 for distance adjustment is away from the workpiece W. That is, the controller 100 may control the actuators 21 to 27 to bend the first arm portion 13 in the direction into which the seventh axis Ax7 is away from the workpiece W.

The procedure of calculating the operation target values of the actuators 21 to 27 by the second calculation unit 114 is not limited to the above procedure. For example, in step S15, the operation target value of the actuator itself, the operation target value falling outside the allowable range, may be set to a value falling within the allowable range, in place of setting the operation target value of the seventh actuator 27. Corresponding to the above calculation, in step S16, the operation target values of the actuators 21 to 26, from which the operation target value set in step S15 is excluded, and the operation target value of the seventh actuator 27, may be calculated.

In step S14, when the operation target values are determined to be outputtable, the controller 100 executes step S17. In step S17, whether the construction of the operation patterns has been completed is determined by the controller 100. To be specific, for example, the target acquisition unit 111 determines whether all of the target values of the position/postures necessary for construction of the operation patterns have been acquired. Whether all of the target values of the position/postures have been acquired is determined based on a completion command input to the programming pendant 120 by the user or a completion command read from a recording medium by the programming pendant 120.

In step S17, when the construction of the operation pattern is determined not to have been completed, the controller 100 returns the processing to step S11. Accordingly, steps S11 to S17 are repeated until when the construction of the operation pattern is completed, and the time series data of the operation target values of the actuators 21 to 27 is constructed.

In step S17, when the construction of the operation pattern is determined to have been completed, the controller 100 terminates the processing.

(Operation of Robots)

With the above configuration, the controller 100 controls the robots 10 to be operated in the operation patterns generated in steps S11 to S17. For example, the controller 100 executes controlling the robots 10 to move the end effectors 17 to the plurality of portions to be machined P1 of the workpiece W, and controlling the robots 10 to apply machining to the portions to be machined P1 by the end effectors 17 in the state where the end effectors 17 are arranged in the portions to be machined P1.

The plurality of portions to be machined P1 may include the portion to be machined P1 existing at a higher position than the base end portion of the first arm portion 13 and the portion to be machined P1 existing at a lower position than the base end portion of the first arm portion 13. In this case, the controller 100 controls the robot 10 to move the end effector 17 between the position higher than the base end portion of the first arm portion 13 and the position lower than the base end portion in a state where the tip portion of the second arm portion 14 is positioned closer to a side of the workpiece W than the base end portion of the first arm portion 13, as illustrated in FIGS. 12A to 12F.

In this process, the tip portion of the first arm portion 13 may be moved between the position higher than the base end portion of the first arm portion 13 and the position lower than the base end portion. That is, controlling the robot 10 to move the end effector 17 between the position higher than the base end portion of the first arm portion 13 and the position lower than the base end portion may include controlling the robot 10 to move the tip portion of the first arm portion 13 between the position higher than the base end portion of the first arm portion 13 and the position lower than the base end portion.

As described above, the robot 10 is positioned to cause the tip portion DP1 of the first arm portion 13 or the base end portion PP2 of the second arm portion 14 to interfere with the workpiece W when the first arm portion 13 is rotated around the second axis Ax2, where the distance L1 is the longest distance L11, in a state where the robot 10 exactly faces the workpiece W. Therefore, when the end effector 17 is moved between the position higher than the base end portion of the first arm portion 13 and the position lower than the base end portion in the state where the distance L1 is fixed to the longest distance L11, the robot 10 may interfere with the workpiece W. When the tip portion of the first arm portion 13 is moved between the position higher than the base end portion of the first arm portion 13 and the position lower than the base end portion in the state where the distance L1 is fixed to the longest distance L11, the possibility that the robot 10 interferes with the workpiece W is increased.

In contrast, according to steps S11 to S17, the operation patterns of the actuators 21 to 27 are generated to make the distance L1 short to avoid the interference between the robot 10 and the workpiece W. In this case, the controller 100 controls the robot 10 to change the distance L1 between the second axis Ax2 and the third axis Ax3 by the seventh actuator 27 in the process of moving the end effector 17 between the position higher than the base end portion of the first arm portion 13 and the position lower than the base end portion. That is, controlling the robot 10 to move the end effector 17 between the position higher than the base end portion of the first arm portion 13 and the position lower than the base end portion may include controlling the robot 10 to change the distance between the second axis Ax2 and the third axis Ax3 by the seventh actuator 27.

Effects by First Embodiment

As described above, according to the machining apparatus 1, when the first arm portion 13 is rotated around the second axis Ax2 where the distance L1 between the second axis Ax2 and the third axis Ax3 is the longest distance L11 in a state where the robot 10 exactly faces the workpiece W, the robot 10 approaches the workpiece W such that the movable range of the tip portion of the first arm portion 13 or the base end portion of the second arm portion 14 interferes with the workpiece. Therefore, the end effector 17 can easily reach a more distal portion to be machined. Therefore, even if the robot 10 is closely arranged to the workpiece W, the end effector 17 can be moved while avoiding the interference between the robot 10 and the workpiece W by shortening the distance L1 between the second axis Ax2 and the third axis Ax3 by the seventh actuator 27. Therefore, achievement of both of an increase in a reaching range by the close arrangement, and an increase in the movable range by the avoidance of interference is ensured, and machining can be applied to the workpiece W in a wide range with the individual robot 10.

Figure 13:
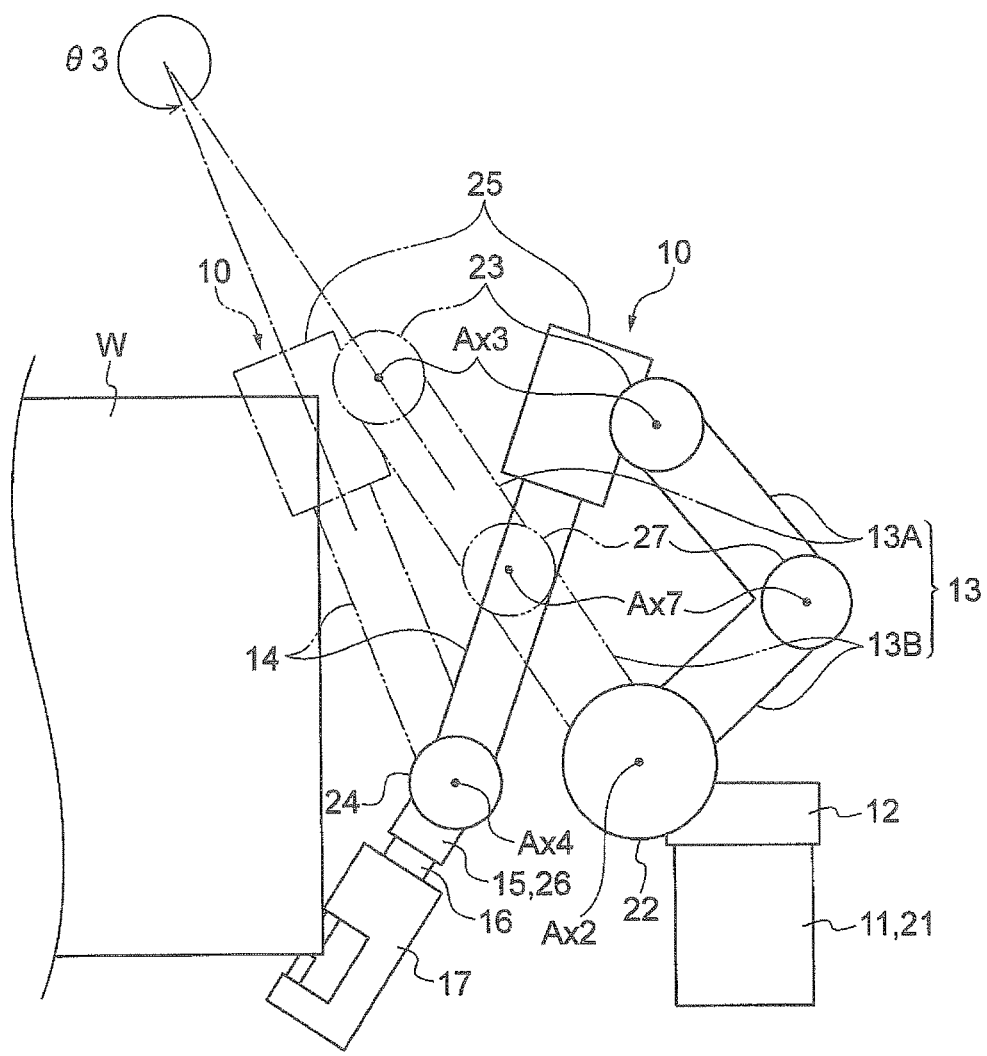
FIG. 13 is a diagram exemplarily illustrating an action of a distance adjustment actuator.

FIG. 13 is a diagram exemplarily illustrating an action of the seventh actuator 27. The robot 10 illustrated by the two-dot chain line in FIG. 13 illustrates a case in which the end effector 17 is arranged to the portion to be machined without bending the first arm portion 13. The robot 10 illustrated by the two-dot chain line interferes with the workpiece W. In contrast, the robot 10 illustrated by the solid line illustrates a case in which the seventh actuator 27 is moved to bend the first arm portion 13 to make the distance between the second axis Ax2 and the third axis Ax3 short. In the robot 10 illustrated by the solid line, the portion between the fourth axis Ax4 and the second axis Ax2 is separated from the workpiece W in a state where the position/posture of the tip portion 16 is maintained, and the interference of the robot 10 to the workpiece W is prevented.

The robot 10 may be positioned to cause the movable range of the tip portion of the first arm portion 13 and the base end portion of the second arm portion 14 not to interfere with the workpiece W when the first arm portion 13 is rotated around the second axis Ax2, where the distance L1 is the shortest distance L12, in a state where the robot 10 exactly faces the workpiece W. In this case, the interference between the robot 10 and the workpiece W can be more reliably avoided. Therefore, achievement of both of the increase in the reaching range by the close arrangement and the increase in the movable range by the avoidance of the interference can be more reliably ensured.

A controller 100 may be further included, which controls the robot 10 to move the end effector 17 between the position higher than the base end portion of the first arm portion 13 and the position lower than the base end portion in the state where the tip portion of the second arm portion 14 is positioned closer to the side of the workpiece W than the base end portion of the first arm portion 13. In this case, machining can be applied to the workpiece W in a wide range with the individual robot 10 by effective use of the configuration that enables achievement of both of the increase in the reaching range by the close arrangement and the increase in the movable range by the avoidance of the interference.

Controlling the robot 10 to move the end effector 17 between the position higher than the base end portion of the first arm portion 13 and the position lower than the base end portion may include controlling the robot 10 to move the tip portion of the first arm portion 13 between the position higher than the base end portion of the first arm portion 13 and the position lower than the base end portion. In this case, machining can be applied to the workpiece W in a wide range with the individual robot 10 by more effective use of the configuration that enables achievement of both of the increase in the reaching range by the close arrangement and the increase in the movable range by the avoidance of the interference.

Controlling the robot 10 to move the end effector 17 between the position higher than the base end portion of the first arm portion 13 and the position lower than the base end portion may include controlling the robot 10 to change the distance L1 between the second axis Ax2 and the third axis Ax3 by the seventh actuator 27. In this case, machining can be applied to the workpiece in a wide range with an individual robot by reliable use of the configuration that enables achievement of both of the increase in the reaching range by the close arrangement and the increase in the movable range by the avoidance of the interference.

The plurality of posture adjustment actuators includes the fourth actuator 24 that swings the wrist portion 15 around the fourth axis Ax4, and the robot 10 may be positioned such that both of the distance from the highest portion to be machined in the workpiece W to the base end PE1 of the first arm portion 13, and the distance from the lowest portion to be machined in the workpiece W to the base end PE1 of the first arm portion 13 become the length La obtained by the formula (1) or less, in a state where the robot 10 exactly faces the workpiece W. In this case, the end effector 17 can be arranged to both of the highest portion to be machined and the lowest portion to be machined in the workpiece W. Therefore, machining can be applied to a wider range with the individual robot 10.

The robot 10 may be positioned such that a distance from a position to the base end PE1 of the first arm portion 13, the position being obtained such that the highest portion to be machined in the workpiece W is shifted upward by a distance equal to the distance from the fourth axis Ax4 to the end effector 17, and a distance from a position to the base end PE1 of the first arm portion 13, the position being obtained such that the lowest portion to be machined in the workpiece W is shifted downward by a distance equal to the distance from the fourth axis Ax4 to the end effector 17 become the length Lb obtained by the formula (2) or less in a state where the robot 10 exactly faces the workpiece W. In this case, the end effector 17 can be arranged to both of the highest portion to be machined and the lowest portion to be machined in the workpiece W, in more various postures. Therefore, machining can be applied to a wider range with the individual robot 10.

The robot 10 may be positioned to cause the height of the base end PE1 of the first arm portion 13 to become the height Ha obtained by the formula (3) or more. In this case, the end effector 17 can be arranged to the highest portion to be machined in the workpiece W in more various postures. Therefore, machining can be applied to a wider range with the individual robot 10.

The robot 10 may be positioned to cause the height of the base end PE1 of the first arm portion 13 to become the height Hb obtained by the formula (4) or less. In this case, the end effector 17 can be arranged to both of the highest portion to be machined and the lowest portion to be machined in the workpiece W in more various postures. Therefore, machining can be applied to the workpiece W in a wider range with the individual robot 10.

The conveyance device 30 that conveys at least one of the workpiece W and the robot 10 may be further included so that a relative position of the workpiece W and the robot 10 is changed when the robot 10 executes machining to the workpiece W. In this case, the tip portion 16 can be appropriately arranged to the portions to be machined in a wide range, by causing the conveyance device 30 and the robot 10 to be in cooperation with each other. Meanwhile, the relative arrangement of the workpiece W and the robot 10 is changed. Therefore, easiness of generation of the interference of the robot 10 with the workpiece W is changed. In contrast, the robot 10 further includes the seventh actuator 27 for distance adjustment, in addition to the actuators 21 to 26 that adjusts the position/posture of the tip portion 16.

Therefore, the posture of the robot 10 between the base 11 and the tip portion 16 can be freely changeable in a state where the position/posture of the tip portion 16 is maintained. Accordingly, the mutual interference can be suppressed flexibly corresponding to the change of the relative arrangement between the workpiece W and the robot 10. The characteristic of easiness of avoidance of the workpiece W provides many options of the arrangement of the robot 10. Therefore, easy construction of a production facility becomes possible.

Further, flexible change of the posture of the robot 10 suppresses the interference of the robot 10 with surrounding devices. Therefore, arrangement of the robots 10 in high density can shorten work time.

The robot 10 may be arranged to be able to apply machining to all of the portions to be machined from the robot side without interfering with the workpiece W. In this case, one robot 10 can apply machining to all of the portions to be machined from the robot 10 side, or a plurality of the robots 10 is arranged to the same one side, and all of the portions to be machined can be shared by these robots 10. Accordingly, flexible construction of the production facility in accordance with the production amount becomes possible. Note that arrangement of the robots 10 to enable machining to all of the portions to be machined is not essential.

The conveyance device 30 may convey the workpiece W. In this case, the configuration of the conveyance device 30 can be more easily simplified than a case where the robot 10 with a large number of power sources is conveyed. Therefore, easier construction of the production facility becomes possible. Note that the conveyance device 30 may just be one that changes the relative position between the workpiece W and the robot 10. Therefore, the conveyance device 30 may be one that conveys the robot 10, or one that conveys both of the workpiece W and the robot 10.

Figure 14:
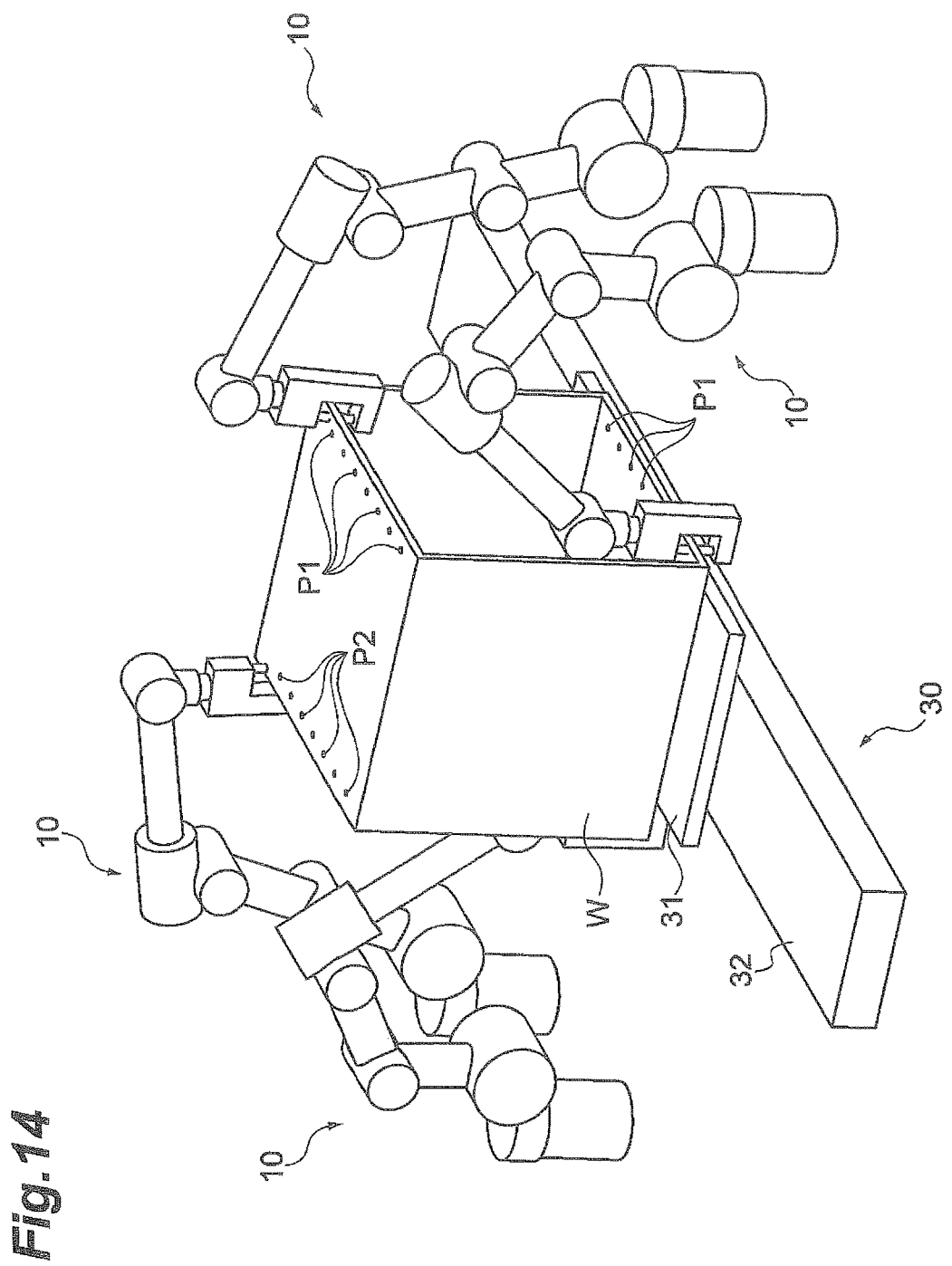
FIG. 14 is a perspective view illustrating another arrangement example of the first robots.

The machining apparatus 1 may include a plurality of the robots 10 arranged along the conveying direction of the conveyance device 30, as illustrated in FIG. 14. Each of the robots 10 arranged along the conveying direction can apply machining to the portion to be machined in a wide range. Therefore, the portions to be machined can be allocated to the plurality of robots 10 arranged along the conveying direction in various patterns, and a more efficient production facility can be constructed.

FIG. 14 illustrates two robots 10 arranged along the conveying direction of the conveyance device 30. However, an embodiment is not limited to the example, and the machining apparatus 1 may include three or more robots 10 arranged along the conveying direction of the conveyance device 30.

The machining apparatus 1 may include the plurality of robots 10 arranged to sandwich the workpiece W in a direction perpendicular to the conveying direction of the conveyance device 30. In this case, all of the portions to be machined are shared by the plurality of robots 10, so that the operation amount of each robot 10 can be suppressed. Accordingly, the interference of the robot 10 with the workpiece W is further suppressed. Further, the arrangement to sandwich the workpiece W in the direction perpendicular to the conveying direction of the conveyance device 30 suppresses the interference between the robots 10. Therefore, easier construction of the production facility becomes possible.

Figure 15:
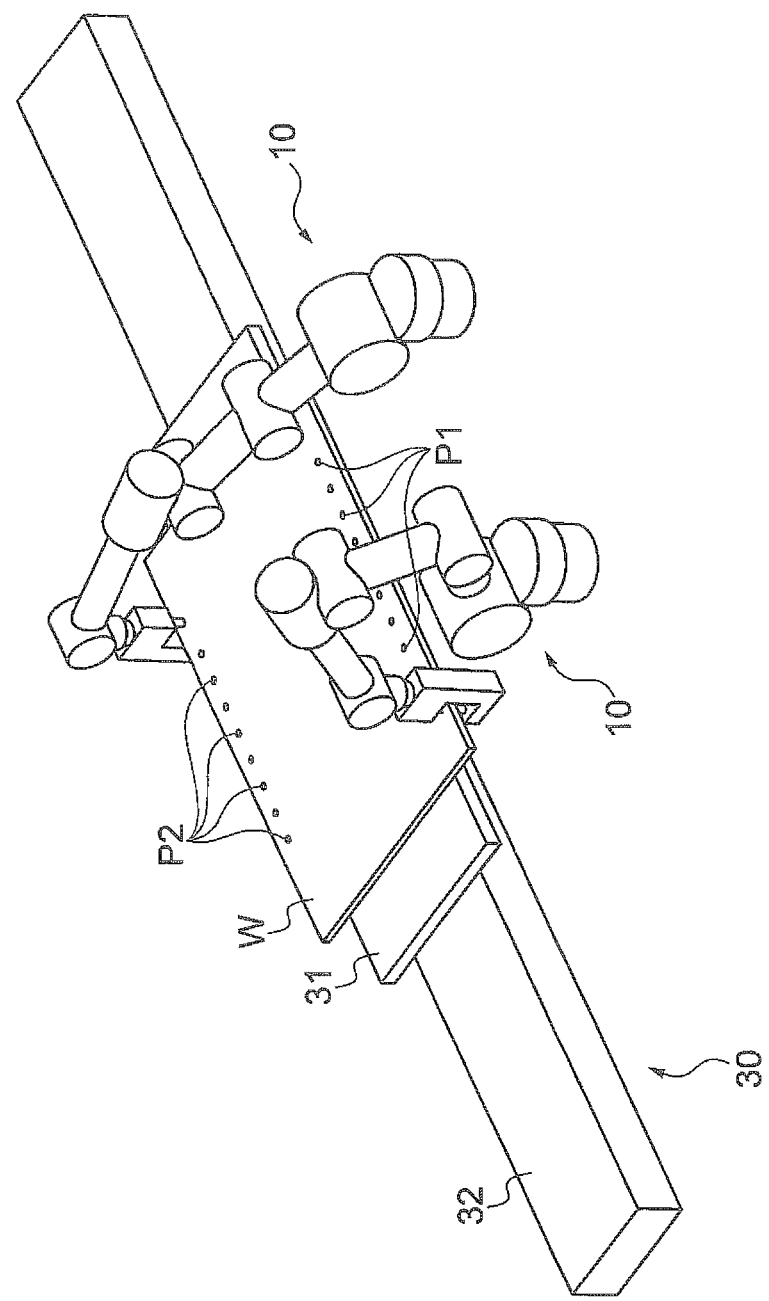
FIG. 15 is a perspective view illustrating still another arrangement example of the first robot.

Arrangement of the plurality of robots 10 to sandwich the workpiece W in the direction perpendicular to the conveying direction of the conveyance device 30 is not essential. For example, as illustrated in FIG. 15, the robots 10 may be arranged only on the left side of the workpiece W. In this case, the robots 10 may be arranged to be able to apply machining to all of the portions to be machined from the side of the robots 10 without interfering with the workpiece W. For example, in FIG. 15, the robots 10 may be arranged to be able to apply machining to both of all of the portions to be machined P1 on the left side and all of the portions to be machined P1 on the right side.

FIG. 15 illustrates two robots 10 arranged along the conveying direction of the conveyance device 30. However, an embodiment is not limited to the example, and the machining apparatus 1 may include only one robot 10.

The controller 100 may include the target acquisition unit 111, the first calculation unit 112, the determination unit 113, the second calculation unit 114, and the output unit 115. The target acquisition unit 111 acquires the target values of the position/posture of the tip portion 16. The first calculation unit 112 calculates the operation target values of the actuators 21 to 26 corresponding to the target values of the position/posture in the condition where the operation target value of the seventh actuator 27 for distance adjustment is fixed. The determination unit 113 determines whether the operation target value of the actuator to be determined falls within the allowable range, where at least any of the actuators 21 to 26 is the actuator to be determined. The second calculation unit 114 calculates the operation target values of the actuators 21 to 26 and the seventh actuator 27 for distance adjustment corresponding to the target values of the position/posture such that the operation target value of at least one actuator to be determined falls inside the allowable range when the operation target value falls outside the allowable range. The output unit 115 controls the actuators 21 to 27 in accordance with the operation target values.

As described above, according to the robot 10, while the interference can be suppressed, the operation target values of the actuators 21 to 27 corresponding to the target values of the position/posture of the tip portion 16 are not determined to one set. Therefore, it is necessary to appropriately set some sort of constraint condition in an instruction of the operation of the robot 10.

In contrast, the controller 100 first calculates the operation target values of the actuators 21 to 26 in the condition where the operation target value of the seventh actuator 27 is fixed. Next, the controller 100 automatically re-calculates the operation target values of the actuators 21 to 26 and the seventh actuator 27 for distance adjustment when the operation target value of the actuator to be determined falls outside the allowable range. When the operation amounts of the actuators of the robot 10 are suppressed to fall within the allowable range, the operation amount of the entire robot 10 is also suppressed. Therefore, the robot 10 tends to less easily cause the interference with the workpiece W or surrounding devices.

For example, in the robot 10 illustrated by the two-dot chain line in FIG. 13, the operation target value of the third actuator 23 falls outside the allowable range. That is, the target value θ3 of the swing angle of the second arm portion 14 with respect to the first arm portion 13 is excessive. In contrast, in the robot 10 illustrated by the solid line in FIG. 13, the operation target values of the actuators 21 to 26 and the seventh actuator 27 for distance adjustment are re-calculated to reduce the target value θ3 of the swing angle of the second arm portion 14 with respect to the first arm portion 13. With the reduction, the portion between the fourth axis Ax4 and the second axis Ax2 is separated from the workpiece W, and the interference of the robot 10 with the workpiece W is prevented.

As described above, employment of the condition that the operation target value of the actuator to be determined is suppressed to fall within the allowable range can reduce a probability of occurrence of the interference with the workpiece W or the surrounding devices. Accordingly, most of the operation pattern with which the tip portion 16 is appropriately arranged near each portion to be machined can be automatically constructed while avoiding the interference with the workpiece W or the surrounding devices. Therefore, a burden of an instruction of the operation to the robot 10 is reduced, and easier construction of the production facility becomes possible.

The seventh actuator 27 for distance adjustment adjusts the distance L1 between the second axis Ax2 and the third axis Ax3 by bending the first arm portion 13 around the seventh axis Ax7 for distance adjustment. In this case, the operation amounts of the actuators 21 to 26 tend to be easily suppressed than a case where the first arm portion 13 is simply expanded/contracted and the distance L1 between the second axis Ax2 and the third axis Ax3 is adjusted. Further, the posture of the robot 10 can be adjusted in more various ways, and the workpiece W or the surrounding devices tend to be easily avoided. Therefore, easier construction of the production facility becomes possible. Note that the seventh actuator 27 may be any actuator as long as the actuator can adjust the distance L1 between the second axis Ax2 and the third axis Ax3. Therefore, for example, the seventh actuator 27 may be a linear actuator that expands/contracts the first arm portion 13.

The seventh axis Ax7 for distance adjustment is parallel to the second axis Ax2. If a robot with the seventh axis Ax7 that is perpendicular to the second axis Ax2 is used, it may be necessary to largely incline portions corresponding to the first arm portion 13 and the second arm portion 14 to a side (a side of a case where the workpiece W side is the front) in order to arrange the tip portion 16 to desired position/posture while avoiding the interference of the robot with the workpiece W. Accordingly, interference with the surrounding devices (for example, with adjacent another robot) may be caused. Therefore, it is necessary to increase an arrangement interval between the robot and the surrounding device. This becomes a case to hinder high-density arrangement of a plurality of robots, for example. In contrast, the seventh axis Ax7 is parallel to the second axis Ax2 in the robot 10. Therefore, it is less likely to cause a necessity to incline the first arm portion 13 and the second arm portion 14 to a side due to at least the rotation operation around the seventh axis Ax7, and the interference with the adjacent surrounding device is less likely to occur. Therefore, options of arrangements of the robot 10 are increased, and easier construction of the production facility becomes possible. The plurality of robots can be arranged in a higher density, and work time can be shortened. Note that it is not essential that the seventh axis Ax7 is parallel to the second axis Ax2.

The seventh axis Ax7 for distance adjustment is also parallel to the third axis. In this case, it is further less necessary to incline the first arm portion 13 and the second arm portion 14 to a side when arranging the tip portion 16 to desired position/posture. Therefore, easier construction of the production facility further becomes possible. The plurality of robots can be arranged in higher density, and the work time can be further shortened. Note that it is not essential that the seventh axis Ax7 is parallel to the third axis Ax3.

The second calculation unit 114 may calculate the operation target values of the actuators 21 to 27 to bend the first arm portion 13 in the direction into which the seventh axis Ax7 for distance adjustment is away from the workpiece W. That is, the controller 100 may control the actuators 21 to 27 to bend the first arm portion 13 in the direction into which the seventh axis Ax7 is away from the workpiece W. In this case, the interference of the robot 10 with the workpiece W and the adjacent surrounding device is more reliably suppressed.

The plurality of posture adjustment actuators that adjusts the posture of the tip portion 16 includes the fifth actuator 25 that rotates the wrist portion 15 around the fifth axis Ax5, the fourth actuator 24 that swings the wrist portion 15 around the fourth axis Ax4, and the sixth actuator 26 that rotates the tip portion 16 around the sixth axis Ax6. In this case, the posture of the tip portion 16 can be freely adjusted by the cooperation of the actuators 24 to 26. Note that the plurality of posture adjustment actuators is not limited to the actuators 24 to 26, and any actuators may be employed as long as the actuators can adjust the posture of the tip portion 16. For example, any of the fourth actuator 24, the fifth actuator 25, and the sixth actuator 26 may be omitted in accordance with the degree of adjustment of the necessary posture.

The determination unit 113 may use at least one of the second actuator 22, the third actuator 23, and the fourth actuator 24 as the actuator to be determined. The operation amounts of these actuators tend to easily correlate with the operation amount of the entire robot. Therefore, these actuators are used as the actuators to be determined, and operation ranges thereof are suppressed to fall within an allowable range, so that the operation amount of the entire robot 10 is more reliably suppressed, and the interference can be further suppressed.

The determination unit 113 may use at least one of the third actuator 23 and the fourth actuator 24 as the actuator to be determined. The operation amounts of these actuators tend to easily correlate with the operation amount of the entire robot. Therefore, these actuators are used as the actuators to be determined, and the operating ranges thereof are suppressed to fall within the allowable range, so that the operation amount of the entire robot 10 can be more reliably suppressed, and the interference can be further suppressed.

The robot 10 may further include a welding device provided to the tip portion 16, as the end effector 17. In this case, welding can be performed to the portions to be machined in a wide range while suppressing the interference of the robot 10 with the workpiece W or the surrounding devices.

According to the machining apparatus 1, the method of producing the workpiece W, the method including arrangement of the workpiece W on the pallet 31 to enable the robot 10 to perform machining to the workpiece W, conveyance of the pallet 31 by the conveyance actuator 32 to change the relative position between the workpiece W and the robot 10, and application of machining to the workpiece W with the robot 10, can be executed.

Further, the method of producing the workpiece W, the method including acquisition of the target values of the position/posture of the tip portion 16, calculation of the operation target values of the actuators 21 to 26 corresponding to the target values of the position/posture in the condition where the operation target value of the seventh actuator 27 is fixed, determination of whether the operation target value of the actuator to be determined fall within the allowable range where at least one of the actuators 21 to 26 is the actuator to be determined, calculation of the operation target values of the actuators 21 to 27 corresponding to the target values of the position/posture to cause the operation target value to fall within the allowable range when the operation target value of at least one actuator to be determined falls outside the allowable range, and controlling the actuators 21 to 27 in accordance with the operation target values, can be executed.

The instruction method including an input of the target values of the position/posture to the controller 100, and storage of the operation target values of the actuators 21 to 27 calculated by the controller 100 to correspond to the target values of the position/posture to the controller can be executed.

2. Second Embodiment

Figure 16:
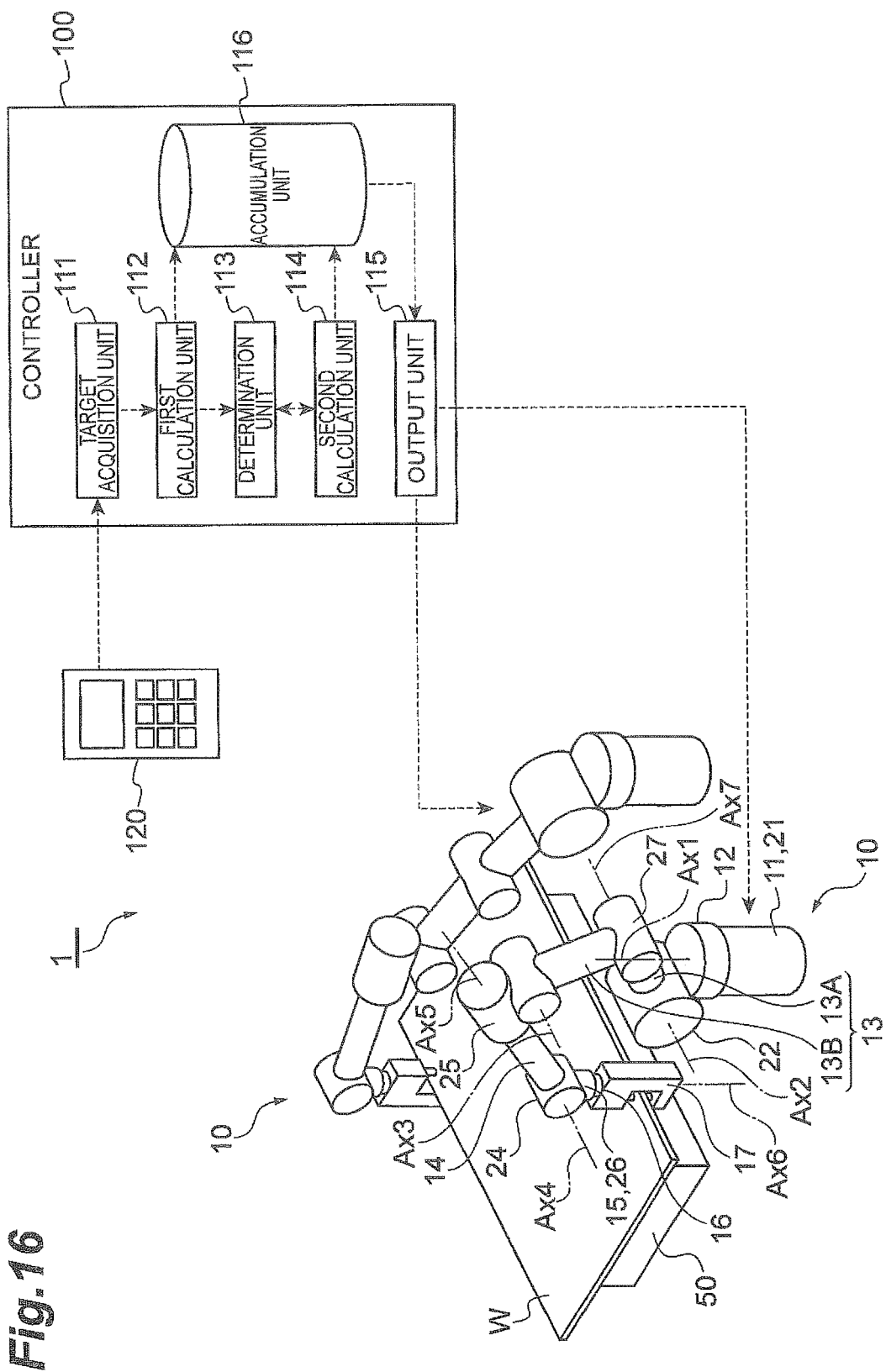
FIG. 16 is a schematic view illustrating a schematic configuration of a machining apparatus according to a second embodiment.
Figure 17:
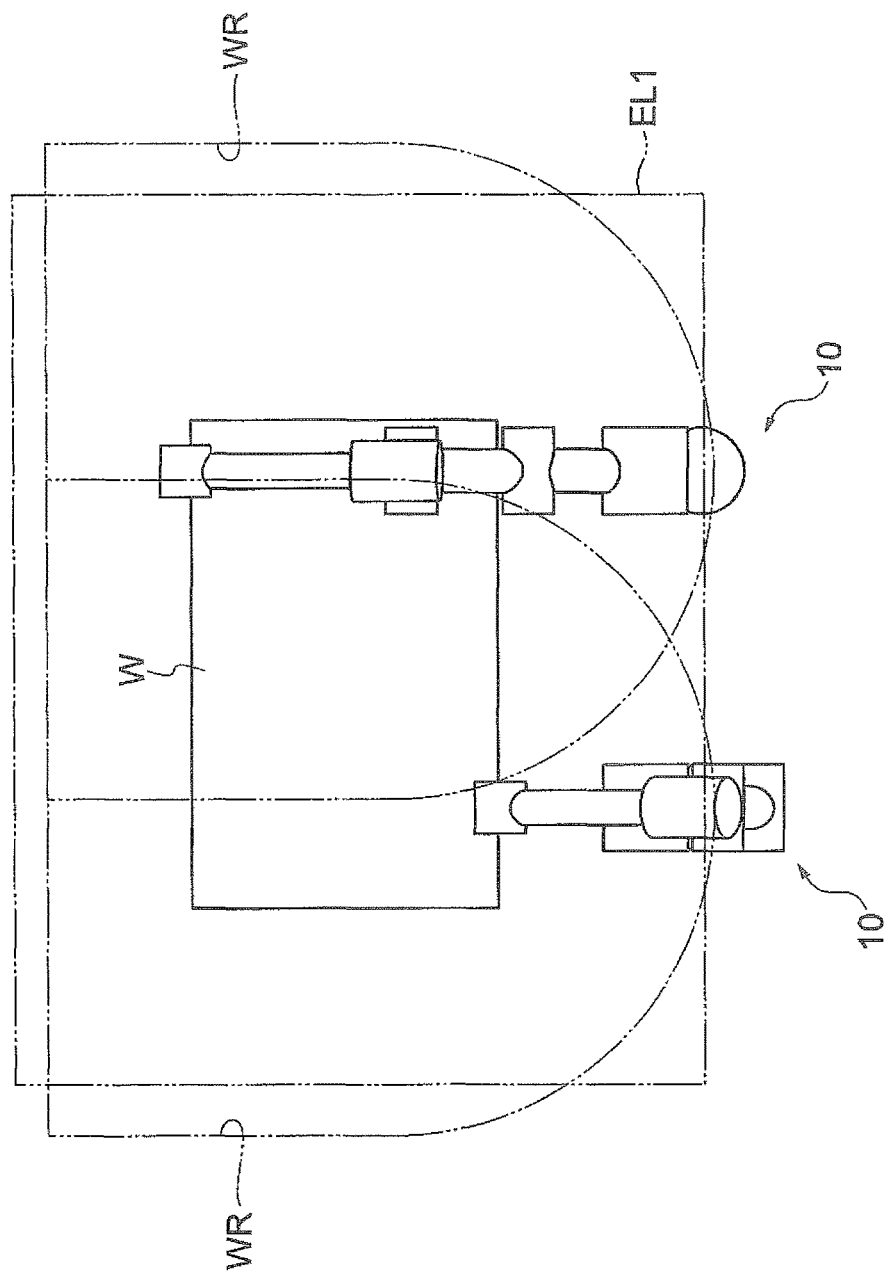
FIG. 17 is a plan view illustrating movable ranges of robots.

As illustrated in FIG. 16, a machining apparatus 1 according to the second embodiment is an apparatus in which the conveyance device 30 of the machining apparatus 1 according to the first embodiment is replaced with a holding table 50 (workpiece arranging portion). The holding table 50 holds a workpiece W in a position where robots 10 can perform machining. As illustrated in FIG. 17, two robots 10 are arranged along a line EL1 that surrounds the workpiece W, and apply machining to the same workpiece W in cooperation with each other. Note that, although the "line that surrounds the workpiece W" does not necessarily extend along a peripheral edge of the workpiece W, the "line that surrounds the workpiece W" does not include a line perpendicular to the peripheral edge of the workpiece W. The robot 10 is arranged such that a movable range WR overlaps with that of another adjacent robot 10. An arrangement condition for the individual robot 10 and the workpiece W is similar to the first embodiment.

Effects by Second Embodiment

As described above, the machining apparatus 1 includes a plurality of robots including the robots 10 and applying machining to the same workpiece in cooperation with each other. The robots 10 are included in the plurality of robots that applies machining to the same workpiece W, whereby interference of the robot with the workpiece W and interference between the robots can be suppressed. Therefore, easy construction of a production facility becomes possible. Arrangement of the plurality of robots in high density can shorten work time.

Figure 18:
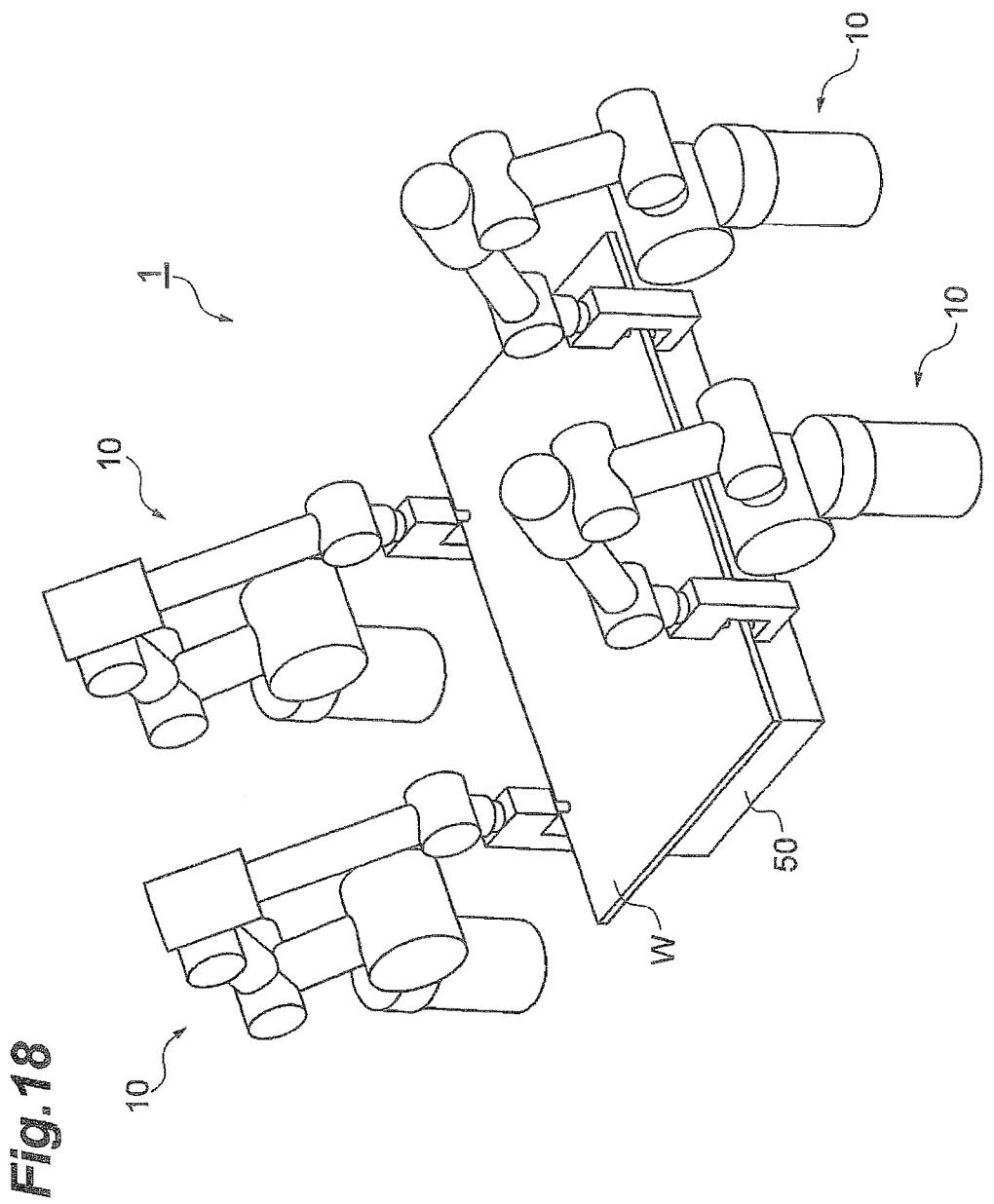
FIG. 18 is a perspective view illustrating another arrangement example of the robots.

The machining apparatus 1 may just include the plurality of robots that applies machining to the same workpiece W. Therefore, the number of robots is not limited to two. For example, as illustrated in FIG. 18, the machining apparatus 1 may include three or more robots. The machining apparatus 1 of FIG. 18 includes four robots 10. The four robots 10 are arranged to surround the workpiece W along the line surrounding the workpiece W.

In the machining apparatus 1 of FIGS. 16 and 18, all of the plurality of robots are the robots 10. Therefore, a posture of the robot between a base 11 and a tip portion 16 is freely changeable in a state where the position/posture of the tip portion 16 is maintained in all of the robots. Therefore, the interference of the robots with the workpiece W and the interference between the robots can be more reliably suppressed.

Figure 19:
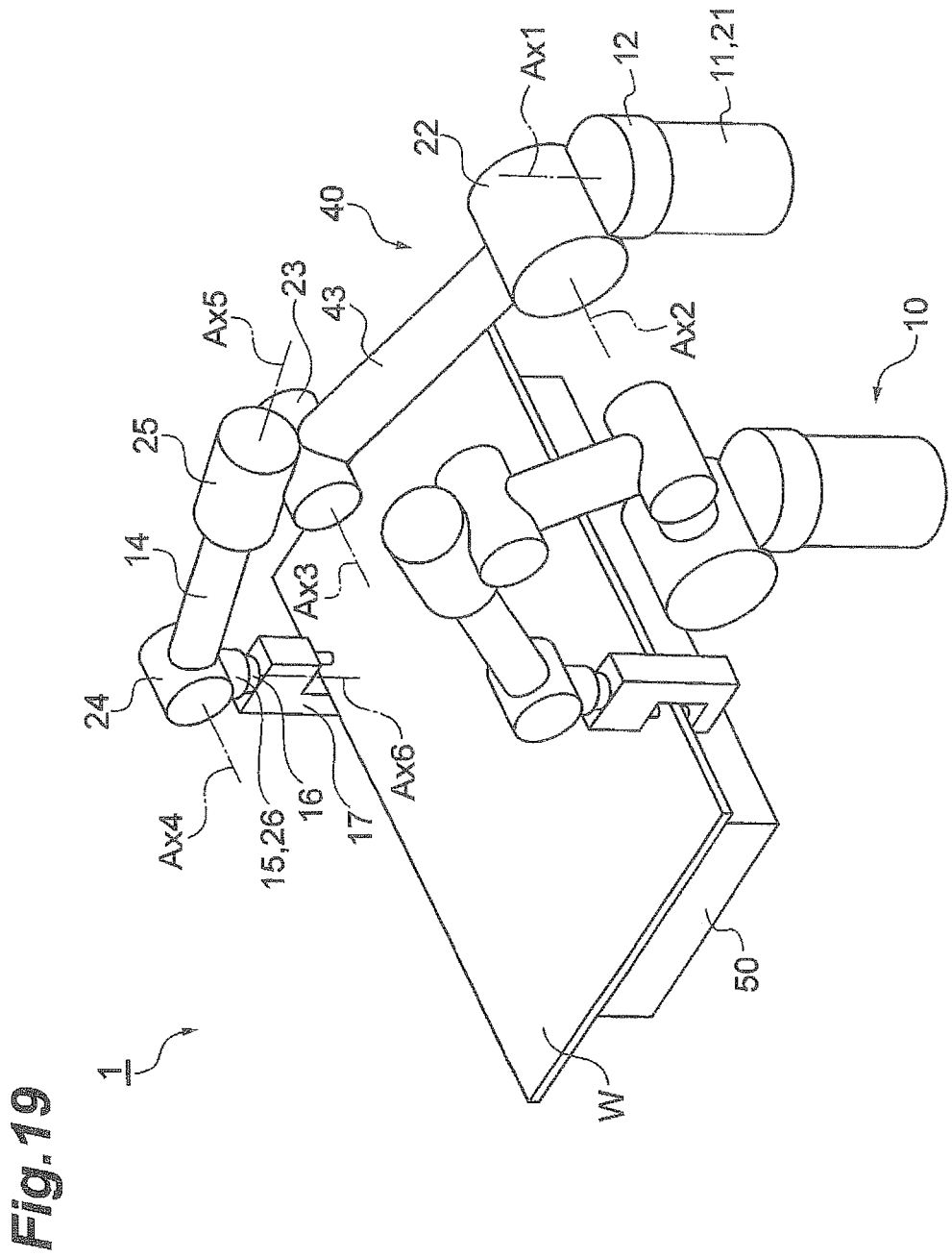
FIG. 19 is a perspective view illustrating still another example of the robots.
Figure 20:
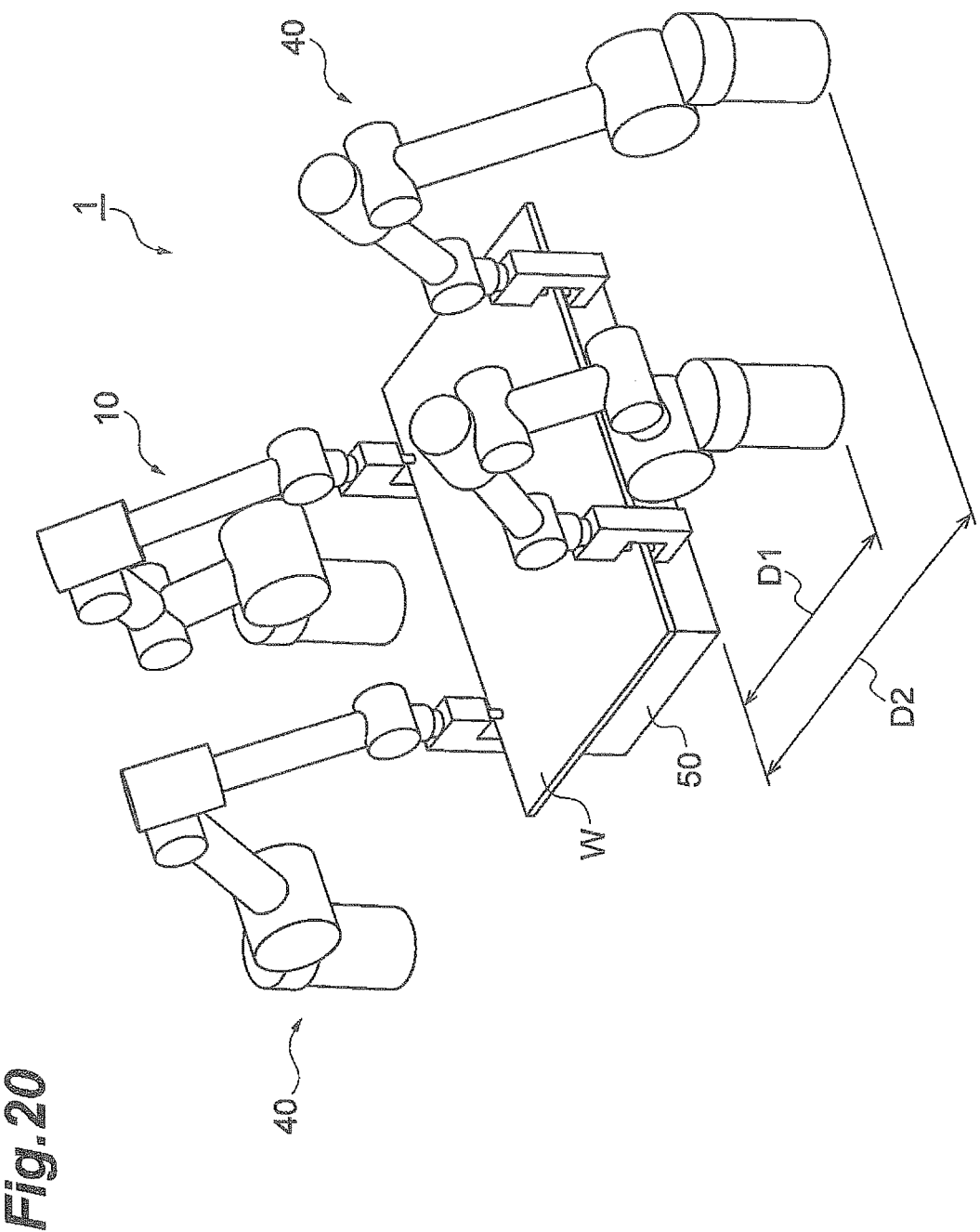
FIG. 20 is a perspective view illustrating still another example of the robots.

Note that it is not essential that all of the robots are the robots 10. For example, as illustrated in FIGS. 19 and 20, a plurality of robots in the machining apparatus 1 may further include a robot 40 (second robot). The robot 40 includes actuators 21 to 26, and does not include a seventh actuator 27 for distance adjustment. The robot 40 is a robot in which the first arm portion 13 and the seventh actuator 27 are replaced with a first arm portion 43. With such a configuration, the robot 10 is included in the plurality of robots, and thus can obtain the effect to suppress the interference of the robot with the workpiece W and the interference between the robots. The number of the robots is not limited. Therefore, the machining apparatus 1 may include two robots as illustrated in FIG. 19, or may include three or more as illustrated in FIG. 20.

The robot 10 and the robot 40 may be arranged to adjacent to each other. In this case, the interference between the robots can be more reliably suppressed.

As illustrated in FIG. 19, the machining apparatus 1 may be configured such that the robot 10 applies machining to a more proximal side of the workpiece W than the robot 40. When performing the machining to the proximal side of the workpiece W, the robot takes a posture in which the arm is folded. In such a posture, the operation amount of some of the actuators tends to easily reach the allowable limit. Further, the folded arm tends to easily interfere with the workpiece W or another robot. Therefore, allocation of the machining to the proximal side of the workpiece W to the robot 10, which can suppress the interference, can more reliably suppress the interference of the robot with the workpiece W and the interference between the robots.

As illustrated in FIG. 20, the machining apparatus 1 may be configured such that the robot 10 is positioned closer to the workpiece W than the robot 40. That is, a distance D1 from the base 11 of the robot 10 to the workpiece W may be smaller than a distance D2 from the robot 40 to the workpiece W. In this case, arranging the robot 10, which can suppress the interference, closer to the workpiece W enables the end effector 17 to reach the workpiece W in a wide range. Accordingly, the portion that cannot be machined by the robot 40 is covered by the robot 10, and the machining can be applied to the workpiece W in a wide range.

All of the robots are fixed to the installation surface, and the robot 10 may be arranged to have the movable range overlap with adjacent another robot. In this case, an effect of suppression of interference by the robot 10 becomes more remarkable.

The embodiments have been described. However, the present invention is not necessarily limited to the above-described embodiments, and various changes can be made without departing from the gist of the invention. For example, the workpiece W of the machining apparatus 1 is not limited to a body of an automobile. The machining apparatus 1 is applicable to machining of a door panel of an automobile, and the like, and is also applicable to machining/assembly of various parts and products in technical fields other than automobiles.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A machining apparatus comprising:
a first robot comprising:
a rotating portion, a first arm portion, a second arm portion, a wrist portion, and a tip portion mutually connected in series, the first arm portion including a first link and a second link, the second link being swingable around a seventh axis with respect to the first link;
a first actuator configured to rotate the rotating portion around a first axis;
a second actuator configured to swing the first arm portion around a second axis passing through a first joint connecting the rotating portion and the first arm portion, the second axis being non-parallel to the first axis and substantially parallel to the seventh axis;
a third actuator configured to swing the second arm portion around a third axis passing through a second joint connecting the first arm portion and the second arm portion, the third axis being substantially parallel to the second axis and the seventh axis;
a fourth actuator configured to swing the wrist portion around a fourth axis passing through a third joint connecting the second arm portion and the wrist portion, the fourth axis being non-parallel to a central axis of the second arm portion;
a fifth actuator configured to rotate the wrist portion around a fifth axis that is non-parallel to the third axis and the fourth axis;
a sixth actuator configured to rotate the tip portion around a sixth axis that is non-parallel to the fourth axis;
a distance adjustment actuator configured to adjust a distance between the second axis and the third axis by rotating the second link around the seventh axis to fold the first arm portion; and
an end effector provided to the tip portion and configured to apply machining to a workpiece, wherein
the first robot is positioned such that a movable range of a tip portion of the first arm portion or a base end portion of the second arm portion interferes with the workpiece when the first arm portion is rotated around the second axis, where the distance is set to be maximum, in a state where the first arm portion is oriented toward the workpiece.

2. The machining apparatus according to claim 1, wherein the first robot is positioned such that a movable range of the tip portion of the first arm portion and the base end portion of the second arm portion do not interfere with the workpiece when the first arm portion is rotated around the second axis, where the distance is made shortest, in a state where the first robot exactly faces the workpiece.

3. The machining apparatus according to claim 1, further comprising:
a circuitry configured to control the first robot to move the end effector between a position higher than a base end portion of the first arm portion and a position lower than the base end portion of the first arm portion, in a state where a tip portion of the second arm portion is positioned closer to a side of the workpiece than the base end portion of the first arm portion.

4. The machining apparatus according to claim 3, wherein controlling the first robot to move the end effector between the position higher than the base end portion of the first arm portion and the position lower than the base end portion of the first arm portion includes controlling the first robot to move the tip portion of the first arm portion between the position higher than the base end portion of the first arm portion and the position lower than the base end portion of the first arm portion.

5. The machining apparatus according to claim 3, wherein controlling the first robot to move the end effector between the position higher than the base end portion of the first arm portion and the position lower than the base end portion of the first arm portion includes controlling the first robot to change a distance between the second axis and the third axis with the distance adjustment actuator.

6. The machining apparatus according to claim 1, wherein the first robot is positioned such that a distance from a highest portion to be machined in the workpiece to the base end of the first arm portion, and a distance from a lowest portion to be machined in the workpiece to the base end of the first arm portion become a length La obtained by a formula (1) or less, in a state where the first robot exactly faces the workpiece, and wherein $$La = L11 + L21 + L31$$

L11 is a longest distance from the second axis to the third axis,
L21 is a distance from the third axis to the fourth axis, and
L31 is a distance from the fourth axis to the end effector.

7. The machining apparatus according to claim 6, wherein the first robot is positioned such that a distance from a position of the fourth axis to the base end of the first arm portion when the end effector is arranged to be able to apply machining to the highest portion to be machined in the workpiece, and a distance from the position of the fourth axis to the base end of the first arm portion when the end effector is arranged to be able to apply machining to the lowest portion to be machined in the workpiece become a length Lb obtained by a formula (2) or less, in a state where the first robot exactly faces the workpiece, and wherein $$Lb = L11 + L21 \qquad (2).$$

8. The machining apparatus according to claim 6, wherein the first robot is positioned such that a distance from the position of the fourth axis to the base end of the first arm portion when the wrist portion is oriented downward in a vertical direction and the end effector is arranged to the highest portion to be machined in the workpiece, and a distance from the position of the fourth axis to the base end of the first arm portion when the wrist portion is oriented upward in the vertical direction and the end effector is arranged to the lowest portion to be machined in the workpiece become the length Lb obtained by the formula (2) or less, in a state where the first robot exactly faces the workpiece, and wherein $$Lb = L11 + L21 \qquad (2).$$

9. The machining apparatus according to claim 8, wherein the first robot is positioned such that a height of the base end of the first arm portion becomes a height Ha obtained by a formula (3) or more, and wherein $$Ha = HH - L21 \cdot \cos \theta - L11 \qquad (3),$$

HH is a height of the fourth axis when the wrist portion is oriented downward in the vertical direction and the end effector is arranged to the highest portion to be machined in the workpiece, and
θ is a minimum value of an angle made by a straight line perpendicular to the third axis and the fourth axis, and a central axis of the wrist portion.

10. The machining apparatus according to claim 9, wherein the first robot is positioned such that the height of the base end of the first arm portion becomes a height Hb obtained by a formula (4) or less, and wherein $$Hb = HL + L21 \cdot \cos \theta + L11 \qquad (4),$$

HL is the height of the fourth axis when the wrist portion is oriented upward in the vertical direction and the end effector is arranged to the lowest portion to be machined in the workpiece.

11. The machining apparatus according to claim 10, wherein the first robot is positioned such that a distance from a position to the base end of the first arm portion, the position being obtained such that the position of the fourth axis when the wrist portion is oriented downward in the vertical direction and the end effector is arranged to the highest portion to be machined in the workpiece is shifted to a front side by a distance Lc obtained by a formula (5), and is shifted downward by a height Hc obtained by a formula (6), and a distance from a position to the base end of the first arm portion, the position being obtained such that the position of the fourth axis when the wrist portion is oriented upward in the vertical direction and the end effector is arranged to the lowest portion to be machined in the workpiece is shifted to a front side by the distance Lc obtained by the formula (5), and is shifted by the height Hc obtained by the formula (6) become a longest distance from the second axis to the third axis or less, in a state where the first robot exactly faces the workpiece, and wherein $$Lc = L21 \cdot \sin \theta \qquad (5), \text{ and}$$

$$Hc = L21 \cdot \cos \theta \qquad (6).$$

12. A method of producing a workpiece, using a machining apparatus including a first robot,
the method comprising:
controlling the first robot to move an end effector to a plurality of portions to be machined of a workpiece; and
controlling the first robot to apply machining to the portion to be machined with the end effector in a state where the end effector is arranged to the portion to be machined,
wherein the first robot includes:
a rotating portion, a first arm portion, a second arm portion, a wrist portion, and a tip portion mutually connected in series, the first arm portion including a first link and a second link, the second link being swingable around a seventh axis with respect to the first link;
a first actuator configured to rotate the rotating portion around a first axis;
a second actuator configured to swing the first arm portion around a second axis passing through a first joint connecting the rotating portion and the first arm portion, the second axis being non-parallel to the first axis and substantially parallel to the seventh axis;
a third actuator configured to swing the second arm portion around a third axis passing through a second joint connecting the first arm portion and the second arm portion, the third axis being substantially parallel to the second axis and the seventh axis;
a fourth actuator configured to swing the wrist portion around a fourth axis passing through a third joint connecting the second arm portion and the wrist portion, the fourth axis being non-parallel to a central axis of the second arm portion;

a fifth actuator configured to rotate the wrist portion around a fifth axis that is non-parallel to the third axis and the fourth axis;

a sixth actuator configured to rotate the tip portion around a sixth axis that is non-parallel to the fourth axis;

a distance adjustment actuator configured to adjust a distance between the second axis and the third axis by rotating the second link around the seventh axis to fold the first arm portion; and the end effector provided to the tip portion and configured to apply machining to the workpiece, wherein the work piece is located at a position where a tip portion of the first arm portion or a base end portion of the second arm portion interferes with the workpiece when the first arm portion is rotated around the second axis in a state where the distance between the second axis and the third axis is set to be maximum and where the first arm portion is oriented toward the workpiece, and wherein the controlling the first robot to move the end effector to the plurality of portions to be machined of the workpiece includes moving of the end effector between a position higher than a base end of the first arm portion and a position lower than the base end of the first arm portion while changing the distance between the second axis and the third axis with the distance adjustment actuator.

13. A machining apparatus comprising:

a first robot comprising:

a rotating portion, a first arm portion, a second arm portion, a wrist portion, and a tip portion mutually connected in series, the first arm portion including a first link and a second link, the second link being swingable around a seventh axis with respect to the first link;

a first actuator configured to rotate the rotating portion around a first axis;

a second actuator configured to swing the first arm portion around a second axis passing through a first joint connecting the rotating portion and the first arm portion, the second axis being non-parallel to the first axis and substantially parallel to the seventh axis;

a third actuator configured to swing the second arm portion around a third axis passing through a second joint connecting the first arm portion and the second arm portion, the third axis being substantially parallel to the second axis and the seventh axis;

a fourth actuator configured to swing the wrist portion around a fourth axis passing through a third joint connecting the second arm portion and the wrist portion, the fourth axis being non-parallel to a central axis of the second arm portion;

a fifth actuator configured to rotate the wrist portion around a fifth axis that is non-parallel to the third axis and the fourth axis;

a sixth actuator configured to rotate the tip portion around a sixth axis that is non-parallel to the fourth axis;

means for adjusting a distance between the second axis and the third axis; and an end effector provided to the tip portion and configured to apply machining to a workpiece, wherein the first robot is positioned such that a movable range of a tip portion of the first arm portion or a base end portion of the second arm portion interferes with the workpiece when the first arm portion is rotated around the second axis, where the distance is set to be maximum, in a state where the first arm portion is oriented toward the workpiece.

14. The machining apparatus according to claim 13, further comprising:

a means for controlling the first robot to move the end effector between a position higher than a base end portion of the first arm portion and a position lower than the base end portion of the first arm portion, in a state where a tip portion of the second arm portion is positioned closer to a side of the workpiece than the base end portion of the first arm portion.

15. The machining apparatus according to claim 1, further comprising:

at least one additional robot configured to apply machining to a same workpiece in cooperation with the first robot.

16. The machining apparatus according to claim 15, wherein the at least one additional robot includes a second robot arranged adjacent to the first robot, wherein the second robot includes:

an additional rotating portion, an additional first arm portion, an additional second arm portion, an additional wrist portion, and an additional tip portion mutually connected in series;

an additional first actuator configured to rotate the additional rotating portion around an additional first axis;

an additional second actuator configured to swing the additional first arm portion around an additional second axis passing through an additional first joint connecting the additional rotating portion and the additional first arm portion, the additional second axis being non-parallel to the additional first axis;

an additional third actuator configured to swing the additional second arm portion around an additional third axis passing through an additional second joint connecting the additional first arm portion and the additional second arm portion, the additional third axis being substantially parallel to the additional second axis;

an additional fourth actuator configured to swing the additional wrist portion around an additional fourth axis passing through an additional third joint connecting the additional second arm portion and the additional wrist portion, the additional fourth axis being non-parallel to a central axis of the additional second arm portion;

an additional fifth actuator configured to rotate the additional wrist portion around an additional fifth axis that is non-parallel to the additional third axis and the additional fourth axis;

an additional sixth actuator configured to rotate the additional tip portion around an additional sixth axis that is non-parallel to the additional fourth axis, and wherein the second robot is free of a distance adjustment actuator configured to adjust a distance between the additional second axis and the additional third axis.

17. The machining apparatus according to claim 16, wherein the first robot is configured to apply machining to a first point of the work piece, wherein the second robot is configured to apply machining to a second point of the work piece, and wherein a distance between the additional rotating portion of the second robot and the second point is longer than a distance between the rotating portion of the first robot and the first point.

18. The machining apparatus according to claim 16, wherein the first robot is positioned closer to the workpiece than the second robot.

19. The machining apparatus according to claim 15, wherein all of the first robot and the at least one additional robot are fixed to an installation surface.

20. The machining apparatus according to claim 19, wherein the first robot is arranged such that a movable range of the first robot overlaps with a movable range of another robot of the at least one additional robot adjacent to the first robot.

\* \* \* \* \*